Sept. 30, 1952 — R. L. FRAZIER ET AL — 2,612,331
AUTOMATIC FLIGHT CONTROLLER
Filed March 19, 1947 — 11 Sheets-Sheet 3

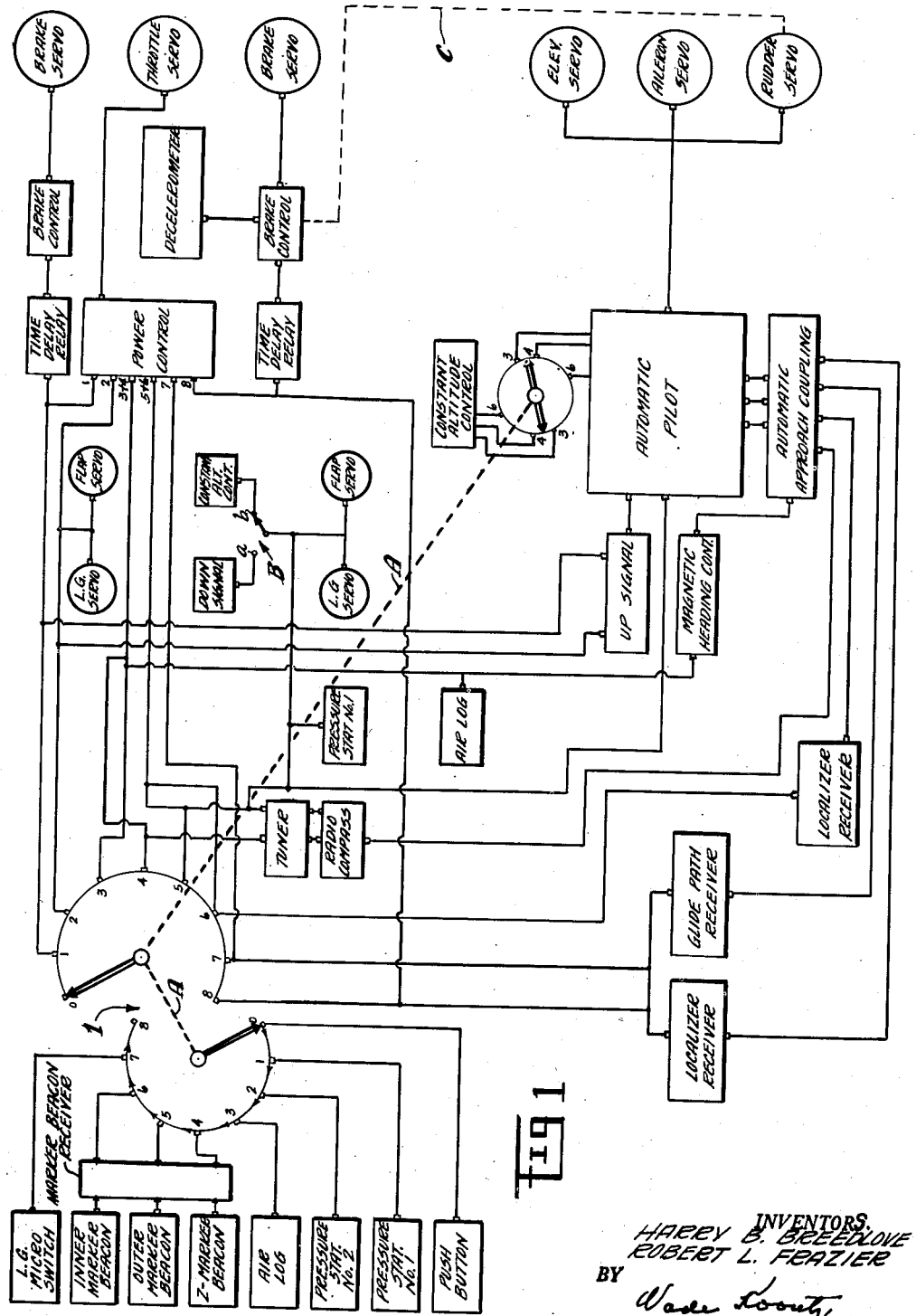

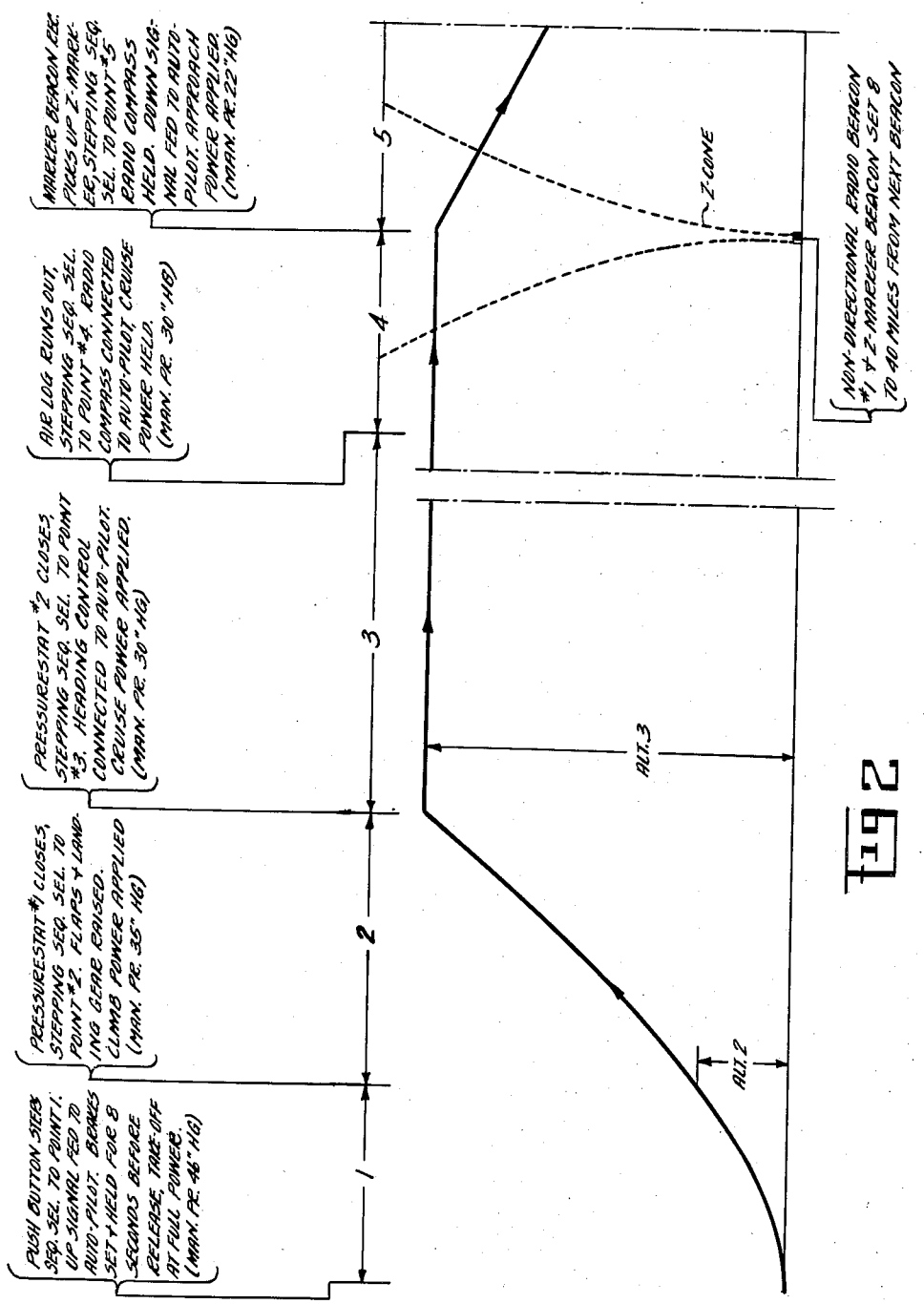

INVENTORS.
HARRY B. BREEDLOVE
ROBERT L. FRAZIER
BY Wade Koontz and
Raymond J. Crowley
ATTORNEYS

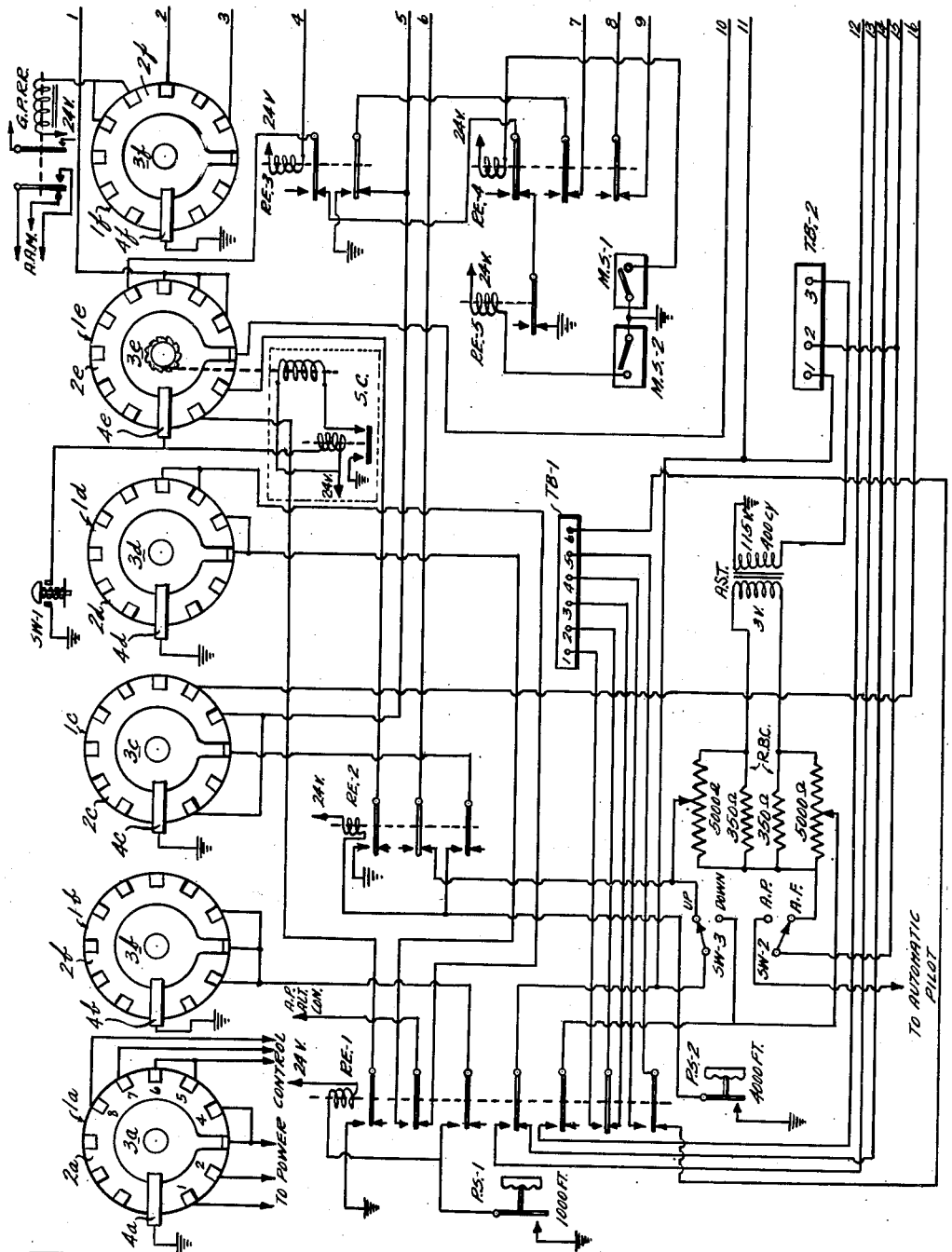

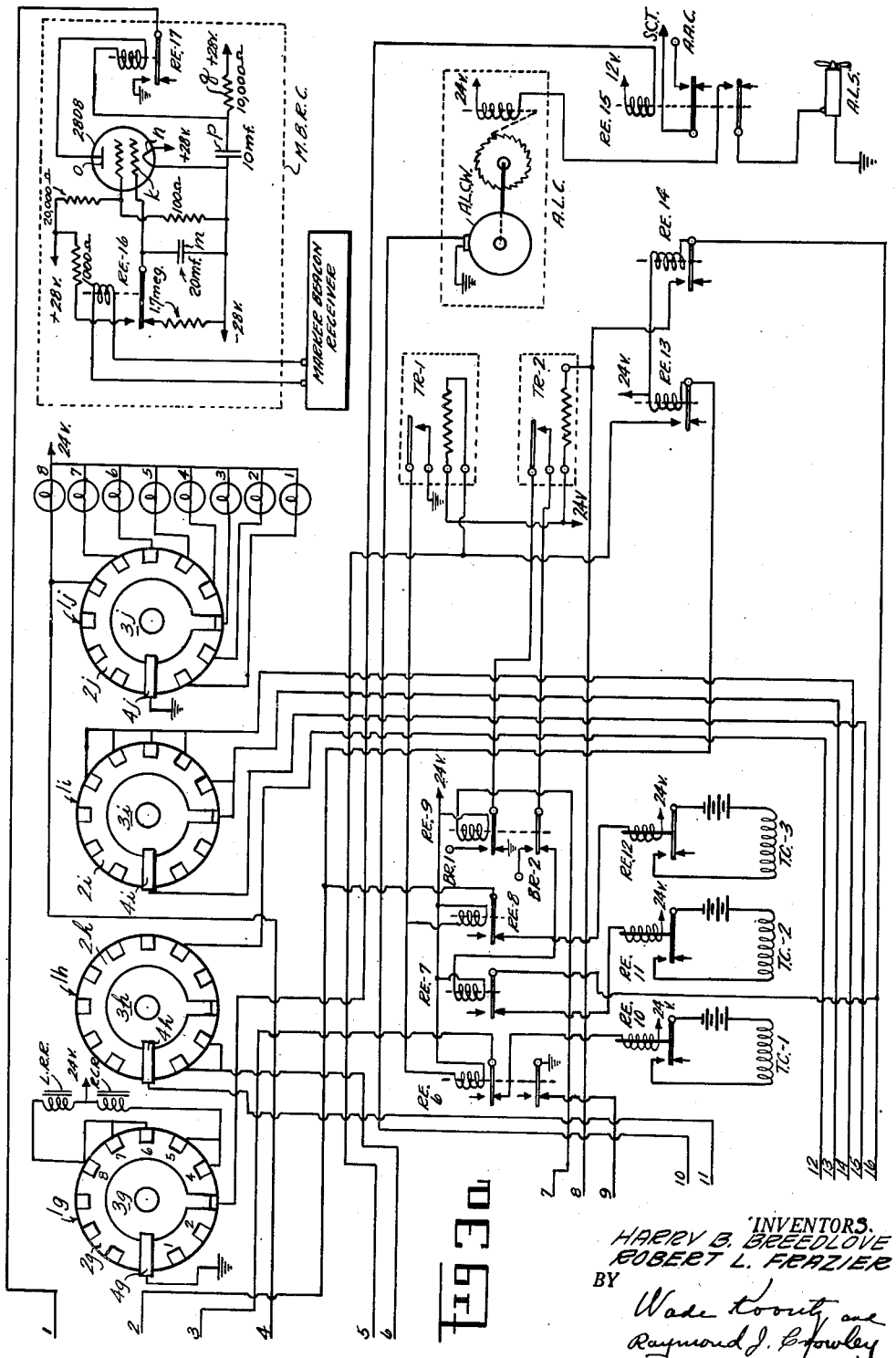

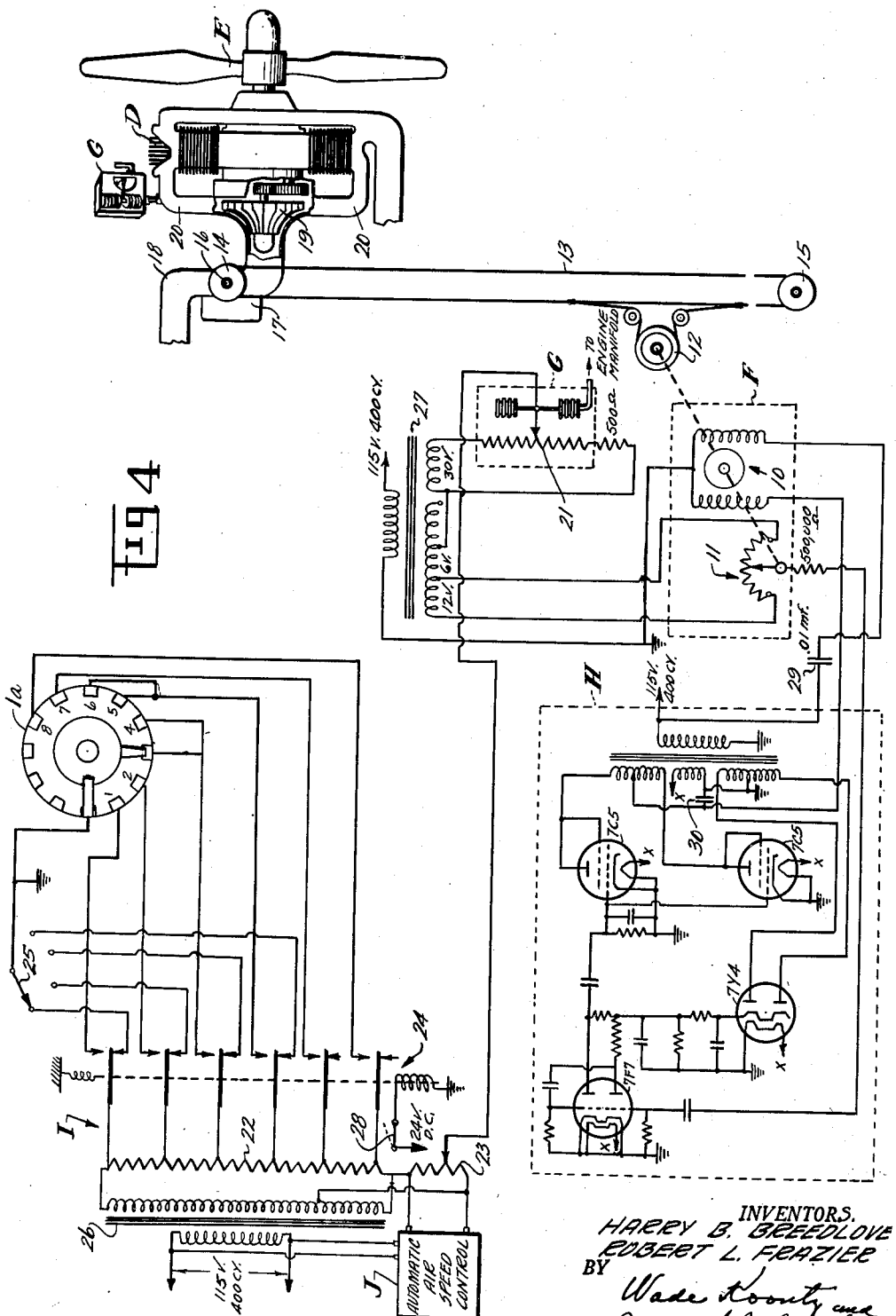

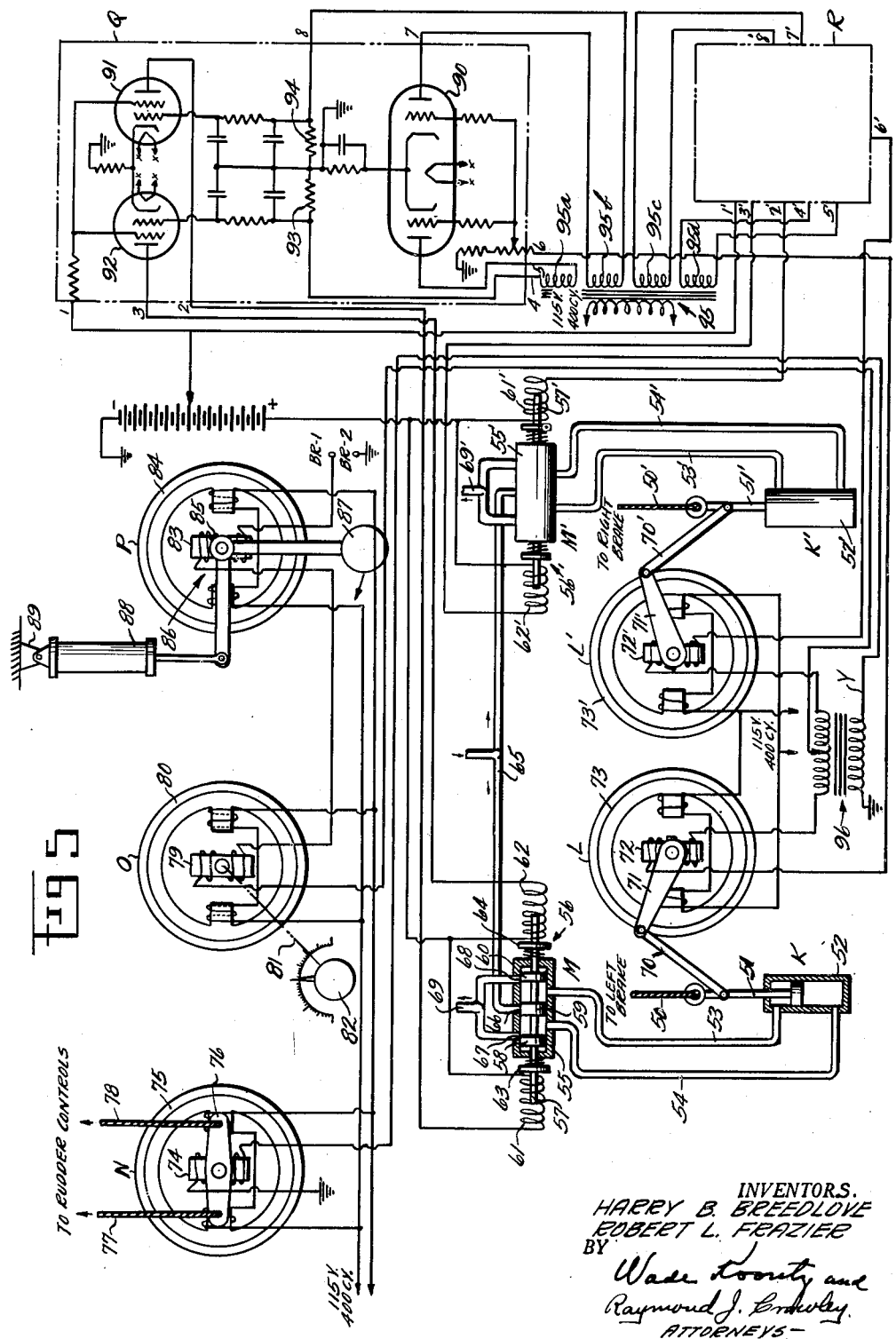

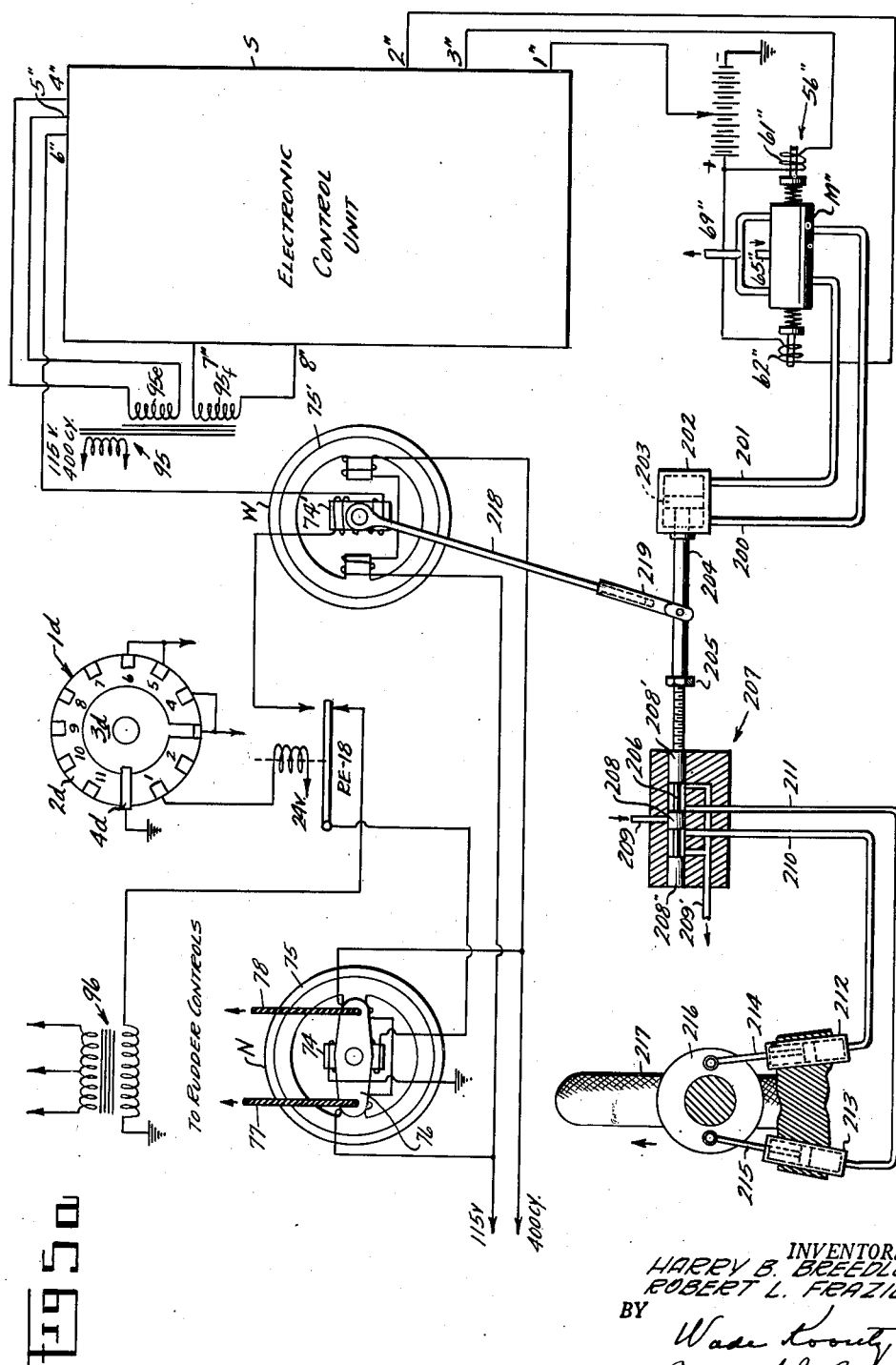

Sept. 30, 1952 R. L. FRAZIER ET AL 2,612,331
AUTOMATIC FLIGHT CONTROLLER
Filed March 19, 1947 11 Sheets-Sheet 9
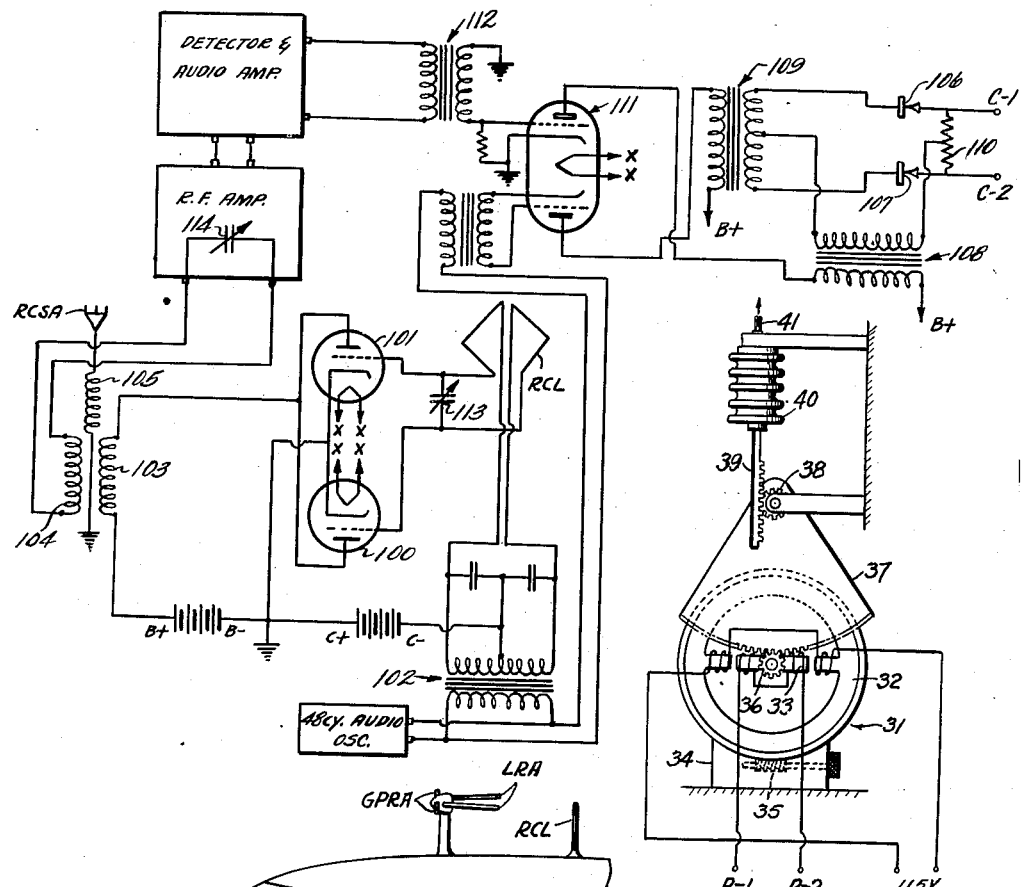

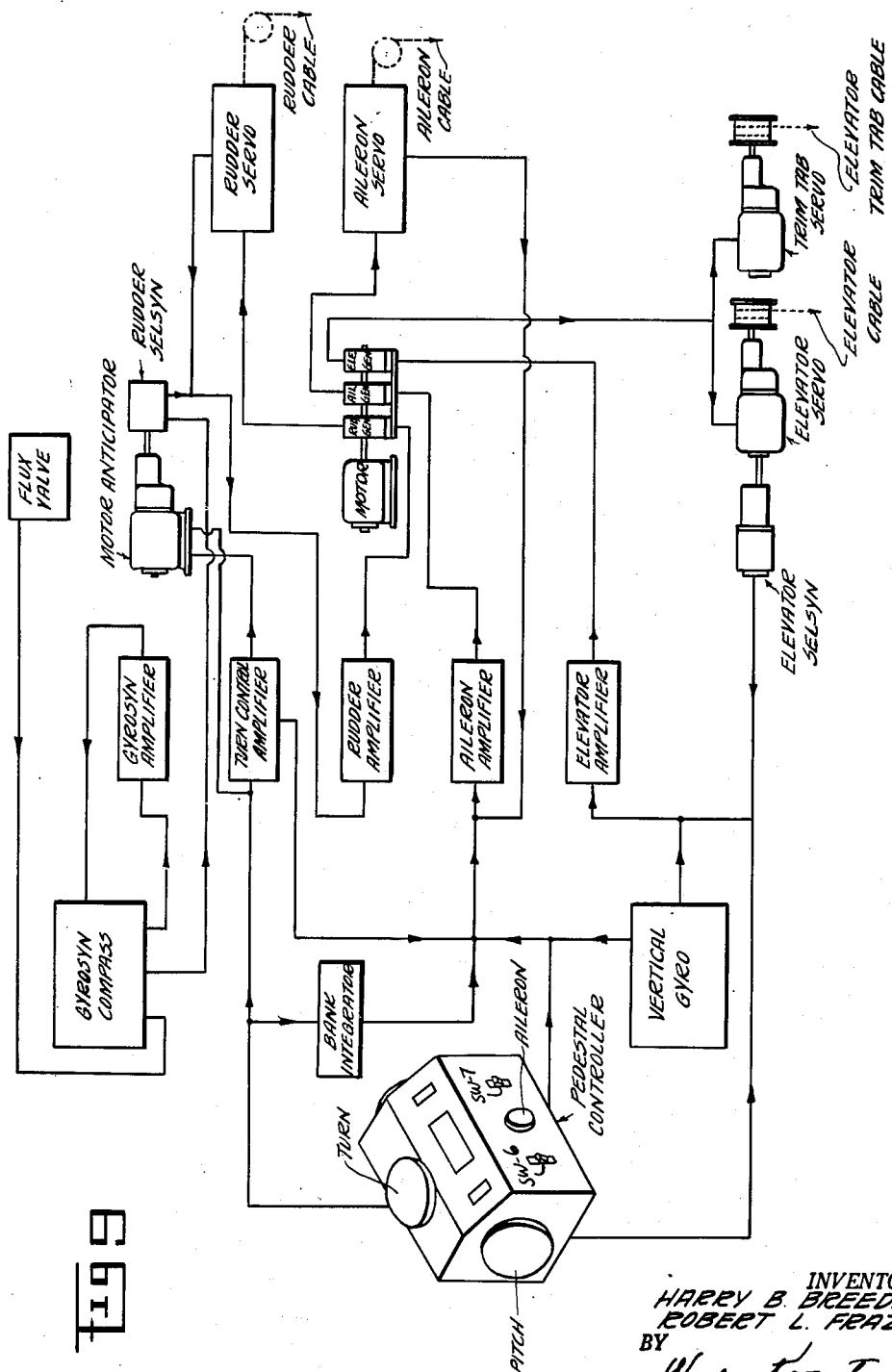

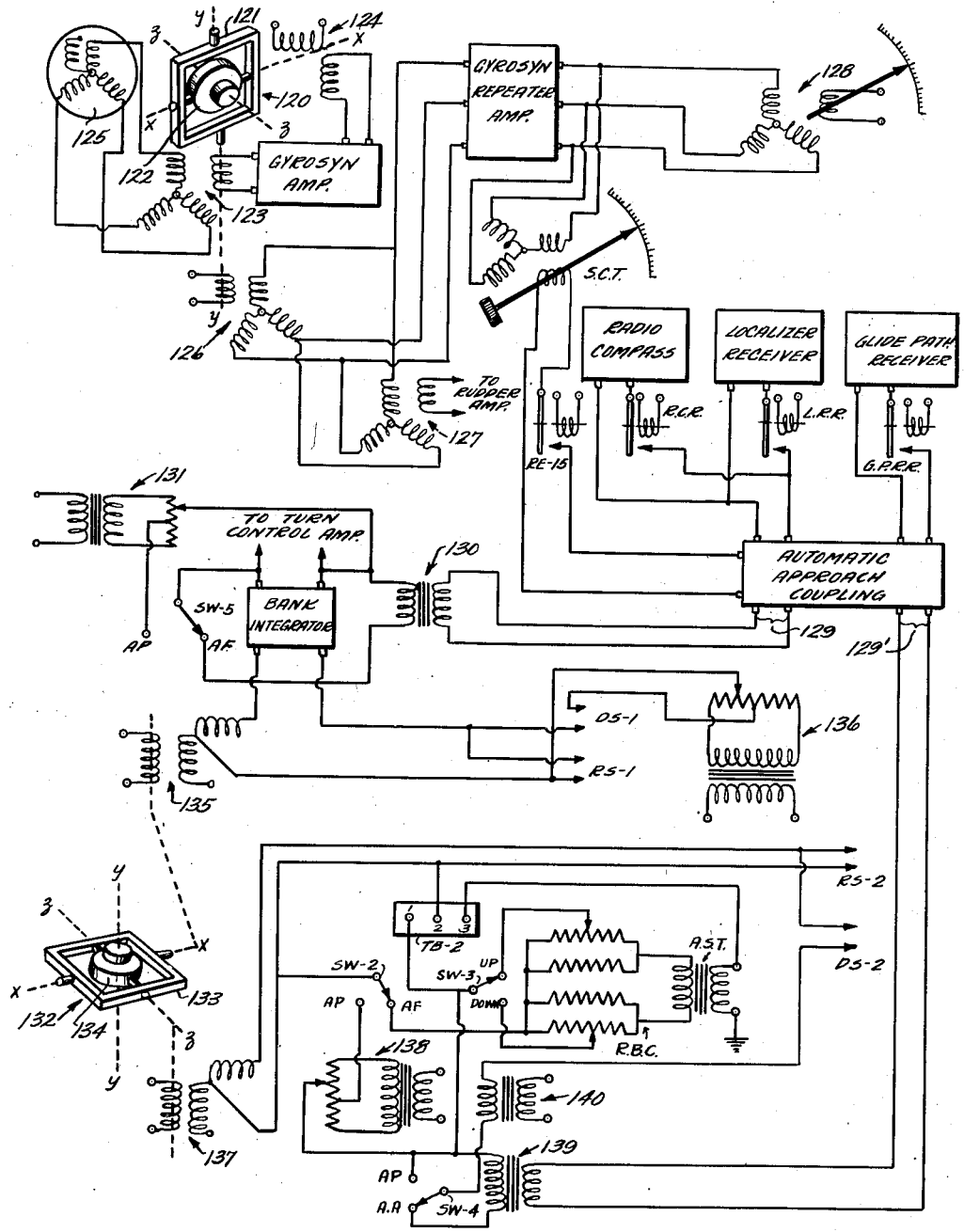

UNITED STATES PATENT OFFICE 2,612,331

AUTOMATIC FLIGHT CONTROLLER

Robert L. Frazier, St. Louis, Mo., and Harry B. Breedlove, Baton Rouge, La.

Application March 19, 1947, Serial No. 735,590

24 Claims. (Cl. 244—77)

(Granted under the act of March 3, 1883, as amended April 30, 1928; 370 O. G. 757)

The invention described herein may be manufactured and used by or for the Government for governmental purposes without payment to us of any royalty thereon.

The present invention relates to a system for automatically controlling aircraft during take-off, point-to-point flight and landing.

The principal object of the invention is to provide complete flight control of aircraft, including take-off and landing, and to include control means effective to select a predetermined sequence of flight operations and translate the desired operations into automatic actuation of the standard aircraft controls such as elevators, rudder, ailerons, engine throttle, wing flaps and wheel brakes.

Another object of the invention is the provision of aircraft control means automatically operative for landing an aircraft under conditions of zero visibility. Blind landing systems usually depend on the interpretation of signals by the airplane pilot and are thus subject to human error in misinterpretation or lack of attention. However by providing an aircraft control system whereby the flight sequence is predetermined and the approach and landing is effected by automatic control any failure can only be of a mechanical nature.

A related object of the invention is to provide in combination with an aircraft, an automatic gyropilot and control apparatus connected to the gyropilot for effecting automatic flight over a predetermined course and in accordance with a predetermined flight plan starting from one airfield and landing at another airfield. More specifically it is intended that an electrical gyropilot be connected through its signal system with a combination of electrical signal producing devices capable of feeding signals to the gyropilot to effect appropriate and coordinated aircraft control. Besides providing correct aircraft heading at each stage of the aircraft flight, it is desired to obtain controlled up and down movements of the aircraft as well as to hold the aircraft at selected altitudes over extended phases of the flight. It is a related purpose of the invention to provide a combination of electrical devices controlled by the direction of the earth's magnetic field to hold the aircraft on a pre-set course, especially over an extended cruise phase of the flight. It is also an object to obtain directional control of the aircraft by applying to the electrical gyropilot a radio compass signal output having directional characteristics according to the orientation of the aircraft with respect to a direct course toward a nondirectional radio station.

A further object of the invention is to provide an aircraft control apparatus including a sequentially operated switching device adapted to close a group of circuits at each step of the switching device, so as to effect control over a plurality of aircraft control elements at each stage of a planned flight. Accordingly by providing automatic devices to move the switching device from each sequential step to the next at the proper time, the control apparatus becomes completely automatic from start to finish.

An important object of the invention resides in the provision of means to control the braking of an aircraft automatically upon landing, whereby the application of the brakes on the left and right wheels will not only bring the craft to a stop but will also act to guide it along a selected runway or landing field. Included in this brake control combination means is also provided to slow the aircraft down gradually and at a steady rate of deceleration.

Another important object is to provide a coordinated and fully automatic engine control system for an aircraft with provision for varying throttle or power settings effective to control the engine or engines according to a predetermined and complete plan adapted for universal application to existing aircraft.

Automatic aircraft control systems have previously been proposed, as for instance in U. S. Patent No. 2,322,225 to Crane et al. With a full appreciation of the merit and utility inherent in the prior art systems, it is a further object of the invention to improve the effectiveness, reliability and precision of automatic aircraft control systems and system components heretofore known. Specifically it is an object of the invention to provide a completely coordinated aircraft control system which will control all the operating units of a modern aircraft, the system including control means for the aircraft engines, for the aircraft control surfaces, for the wing flaps and retractible landing gear and for the landing gear wheel brakes. The complete system according to the invention provides a predetermined sequential operation of the various aircraft controls conforming to a desirable and well-considered flight plan. Moreover the system of the invention is flexible enough to make possible variations of any single flight plan. Possible variations in the flight plan will be pointed out in the detailed description.

The invention consists substantially in the construction, combination, location and relative arrangement of parts and circuits for obtaining the results desired in accordance with the objects of invention stated above, or as implied in the detailed description or in the claims.

The above stated and other objects of invention will become apparent on reading the following detailed description and claims in conjunction with the drawings, in which:

Fig. 1 is a diagrammatic view of the aircraft control system showing the coordinated hookup of the various aircraft control units.

Figs. 2 and 2a together form a self-explanatory diagram of the predetermined flight plan as accomplished by use of the present aircraft control system.

Figs. 3 and 3a together form a wiring diagram of the present aircraft control system.

Fig. 4 is a combined electrical and mechanical diagram of the power control portion of the system.

Fig. 5 is a combined electrical and mechanical diagram of the brake control portion of the system.

Fig. 5a illustrates a modification of the system shown in Fig. 5.

Fig. 6 is a schematic view of the automatic air speed control device forming part of the power control portion of the system.

Fig. 7 is a wiring diagram of the radio compass and radio compass coupling forming part of the system.

Fig. 8 is a perspective view of the forward end portion of an airplane fuselage to show the antenna installations employed with the present aircraft control system.

Fig. 9 is a diagrammatic view of the automatic pilot which forms an essential unit of the aircraft control system.

Fig. 10 is a wiring diagram of the automatic pilot as used with the present system.

Figure 2A:
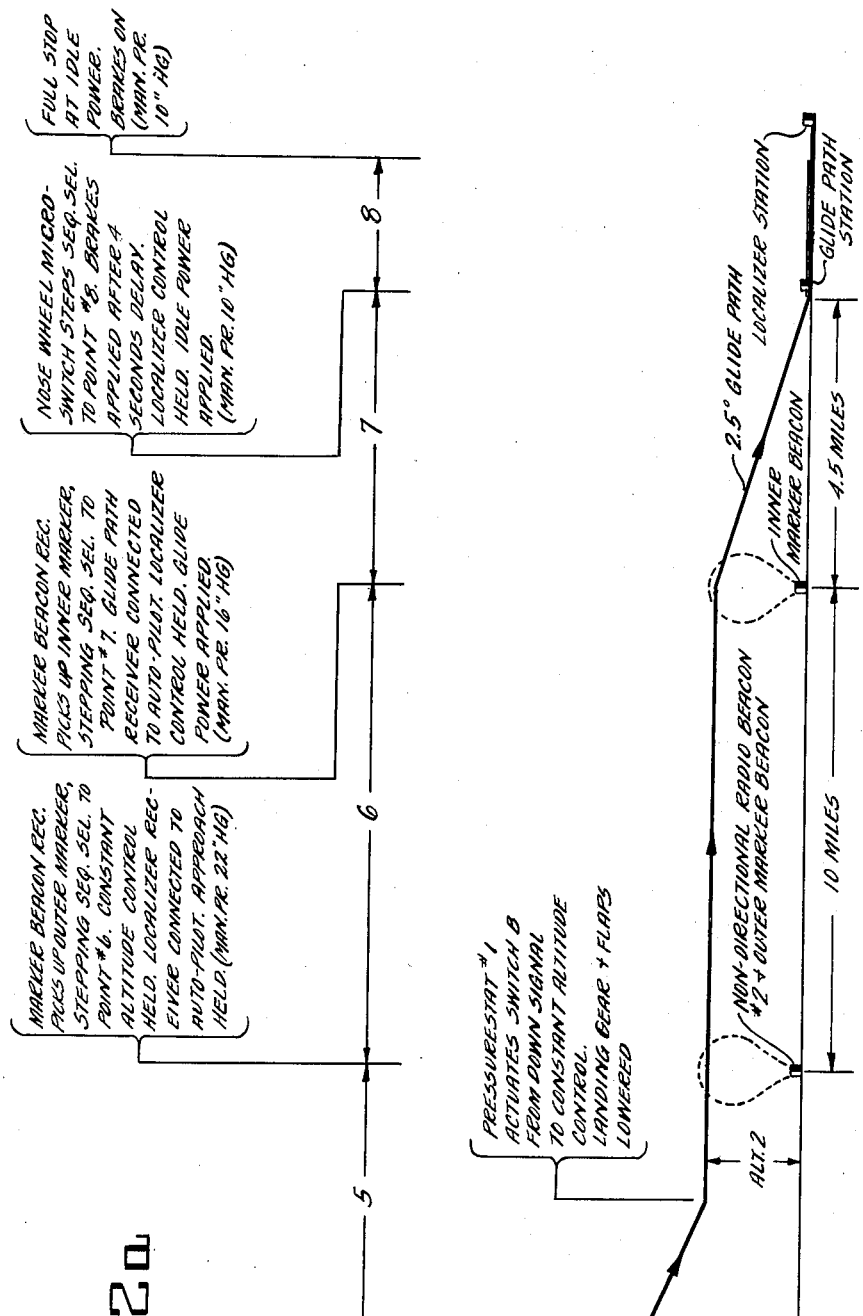

The essential units which together form the aircraft control system are shown in Fig. 1 and in order to show the sequence of operations or steps forming the system, the automatic or master sequence selector is shown diagrammatically and indicated by numeral 1. The details of the actual sequence selector will be discussed below but as shown in Fig. 1 the selector is illustrated as providing means to initiate a desired sequence of aircraft control operations by providing electrical connections to the respective control units. At the left of the selector 1 is shown the means to initiate the sequential steps from 1 to 8 and at the right of selector 1 is shown the control units and schematic wiring diagram. Operation of these control units results in eight main operational steps numbered from 1 to 8, and taken in sequence these steps form a predetermined and orderly flight plan. These steps are as follows:

1. Take-off
2. Steady climb
3. Navigation or cruise
4. Initial approach
5. Final approach I
6. Final approach II
7. Final approach III
8. Landing (to full stop).

The sequence actuating or initiating devices are used to step the sequence selector to the various steps, stations or points as above enumerated in response to various mechanical or electrical impulses to which the devices respond. These devices each act in turn on the same sequence selector stepping circuit, as will be explained in detail below. As shown diagrammatically in Fig. 1 the push button or flight starter acts to step the sequence selector from 0 or no-circuit point to point 1 or take-off station, the other selector actuating devices continuing this step-by-step action during the flight as conditions change and the devices respond accordingly. The broken line A indicates a mechanical connection to coordinate selector actuation, as represented by the devices connected to contacts on the smaller arc, with selector circuit connections, as represented by the devices connected to contacts on the larger arc. Line A extends down to the right to indicate coordination of the constant altitude control unit of the automatic pilot, which as indicated becomes effective at selector stations 3, 4 and 6.

There is also one intermediate step in the flight plan coming between points 5 and 6 but this step does not require a separate station on the master sequence selector, although there is no reason why the system could not be modified to add this additional point on the master sequence selector 1. Actually however it was found to be satisfactory to produce this intermediate step 5½ by using an air pressure actuated switch B controlled by the pressurestat No. 1. In the final approach I of the aircraft from a cruise altitude the approach glide is maintained down to an altitude of about 1000 feet at which point pressurestat No. 1 operates to actuate the switch B from contact $a$ to contact $b$, thus changing over from an automatic pilot down signal to the constant altitude control of the pilot and simultaneously lowering the landing gear and wing flaps. The constant altitude control of the automatic pilot is an air pressure responsive device acting to hold the aircraft in level flight at whatever altitude the control is cut in. It will be seen that the fifth phase or step of the flight will thus be a steady glide followed by a period of level flight at approach altitude. While the cruise altitude was selected at 4000 feet and the approach altitude was selected as 1000 feet it should be understood that these are arbitrary figures subject to change by proper selection of pressurestats and these altitudes in no way form operational limitations of the present aircraft control system.

In order to simplify Fig. 1 the constant altitude control, the localizer control, the brake control and the pressurestat No. 1 are shown twice but in the system as actually wired in complete form these units need not be duplicated, as will be seen later in the description. The broken line C connecting the brake control unit and the rudder servo represents a mechanical connection which produces differential or selective brake action on the left and right wheel brakes to guide the aircraft along the runway during the final leading phase of the flight plan, in accordance with localizer control as applied to the rudder servo.

The various steps of the sequential flight plan as produced by a system as outlined in Fig. 1 will now be explained in detail, and at the same time reference will be made to Figs. 2 and 2a to illustrate the sequence steps as they apply to the flight plan of the aircraft and to ground installations which furnish impulses directly affecting the radio compass, marker beacon receiver, localizer receiver and glide path receiver. The steps are as follows:

1. Take-off

With the aircraft stationary on the take-off runway and lined up with the runway the engine is started and warmed up at idling speed by means of manual control devices, and the sequence selector being at zero or no-circuit station the aircraft control system is not yet in operation except that the electric power supply is turned on. However on actuation of the push button or flight starter the sequence selector stepping circuit is closed to step the selector to point 1 to actuate the brake control, the power control and the up signal for the auto-pilot. The brake control circuit in this phase includes time delay relays so as to hold the brakes set for about eight seconds after the selector reaches step 1. The power control at step 1 results in the application of full throttle to give a maximum take-off power and for purposes of illustration and comparison this throttle setting may be stated as giving a manifold pressure of 46 inches of mercury. For take-off an up signal is fed into the auto-pilot to give an angle of ascent of about 5 degrees. The manner in which the auto-pilot effects aircraft control will be explained in some detail below.

2. Steady climb

After take-off the aircraft climbs rather sharply from the runway to an elevation of 1000 feet, or any other preselected elevation, at which time the pressurestat No. 1 actuates a switch which again closes the selector stepping circuit to move the sequence selector to point 2. The circuit thus completed maintains the up signal to the auto-pilot and closes the landing gear servomotor and wing flap servomotor circuits to raise these elements into their full flight positions. Also the power control setting is reduced to a more moderate value, in the present example to about 35 inches of mercury at the intake manifold. An alternative handling of the landing gear may be used if desired by connecting the landing gear servomotor through a time delay relay for operation as part of step 1 or take-off phase. Under this modified plan the relay has a setting of ten seconds or more to allow ample time for clearing the ground before actuation of the landing gear motor. This modification will afford less drag during initial climb and result in more power for an increased rate of climb.

3. Navigation or cruise

The steady climb phase proceeds until the aircraft reaches an elevation selected or possibly dictated by air traffic regulations. For purpose of illustration this has been taken as 4000 feet and the pressurestat No. 2 is actuated at this elevation accordingly, closing the sequence selector stepping circuit once more to step the selector to point 3. The circuits completed at this step cut in the magnetic heading control of the auto-pilot to give the aircraft the heading calculated to take the aircraft to its destination. Also the air log device is connected to complete the navigation phase after an elapsed air mileage preset according to the distance to be flown. The constant altitude control unit of the auto-pilot is cut in to hold the cruise level constant and the power control setting at the throttle is reduced to a lower value for maintenance of level flight at minimum fuel consumption. This value may be stated in the present example to be 30 inches of mercury manifold pressure.

4. Initial approach

Cruise conditions are maintained until the air log device runs to its preset point to close a switch which again operates the sequence selector stepping circuit to move the selector to point 4. The selector then serves to close a circuit to a motor operated tuning device which tunes the radio compass to a preselected wave length. The compass signal is passed through the automatic approach coupling unit to the automatic pilot, thus providing an accurate heading signal to steer the aircraft toward a nondirectional radio beacon (No. 1) of a known wave length corresponding to the setting applied to the radio compass by the tuning device. The automatic approach coupling to be described more fully below is a unit connected to the auto-pilot and which is capable of delivering a phase shifting alternating current to the auto-pilot in response to an input of low voltage direct current of changing polarity, as delivered by the radio compass or by the localizer and glide path receivers to be referred to below.

The radio compass which receives its signal from a nondirectional radio beacon is shown in Fig. 7 and as used in the present system requires a special coupling circuit which includes a vacuum tube. The two antennas indicated in Fig. 7 are shown also in Fig. 8 as they appear on the aircraft. The loop antenna is of the fixed type, having its plane at about a right angle to the longitudinal axis of the aircraft. The sense antenna, which does not have the directional effect inherent in the radio compass loop, is mounted under the aircraft fuselage. In addition to using the output of the radio compass to actuate a left-right indicator, the present system uses the output to hold the auto-pilot on a steady homing course, thus correcting for wind drift or other inaccuracy in heading during the prolonged cruise sequence.

As shown in Fig. 1 the constant altitude control is also used in the initial approach phase (step 4) of the flight plan. The power setting for cruise is also maintained during initial approach, manifold pressure being 30 inches of mercury.

5. Final approach I

Accurate heading at cruise altitude and cruise power setting is maintained until the aircraft comes within the cone-like signal field set up by the Z-marker beacon, which is a type of radio beacon and in the present system is located at or close to the nondirectional radio beacon No. 1. The Z-marker beacon is commonly used in airways control work to provide an upwardly radiating signal marking a nondirectional beacon or radio range beacon and providing a signal response within the cone of silence existing over a beacon station. The signal picked up by the Z-marker beacon is used to actuate the sequence selector stepping circuit again through a relay circuit, to step the selector to point 5. The circuits thus completed by the selector are the radio tuner-radio compass-automatic approach coupling-automatic pilot circuit, the power setting circuit, and through switch B a circuit is also completed to feed a down signal to the automatic pilot. At this time however switch B is connected through the contact $a$ thereof. The glide angle is such that the rate of descent is between 400 and 500 feet per minute, although the rate may run as high as 600 feet per minute. The glide angle may be varied considerably by proper adjustment of the down signal and power control. In this phase of the flight the power setting selected may be stated by way of comparison as 22 inches of mercury, manifold pressure. It is in this glide phase that the automatic air speed control unit of the power control is most important. The approach glide proceeds until the pressurestat No. 1 responds at about 1000 feet to move switch B to contact b thereof. This contact closes a circuit to the constant altitude control of the auto-pilot and at the same time disconnects the auto-pilot down signal. A circuit is also closed to connect the landing gear and wing flap servomotor to a power source, thus lowering these elements to normal approach position.

By reference to Figs. 2 and 2a the nondirectional radio beacons will be noted, being two in number. During the initial approach phase or sequence step 4 the aircraft will home on beacon No. 1, while during final approach I the aircraft will home on beacon No. 2. In each instance the directional control is by means of the radio tuner-radio compass-automatic approach coupling-automatic pilot hookup. The beacons being on different wave lengths the auto-pilot will receive a directional signal from only one beacon at a time. The tuner is built to tune the compass to several different wave lengths or channels, the tuning action being accomplished by closing various circuits each affording a tuning action of a definite extent. The motor of the tuner is cut off after the proper movement is obtained and the radio compass tuning condenser is stopped exactly at the selected setting. The construction of these electro-mechanical radio tuners is well-known, and no purpose would be served by complete illustration thereof.

6. *Final approach II*

The constant altitude portion of sequence step 5 will continue until the outer marker beacon is reached (this being also the approximate location of the second nondirectional radio beacon). At this location the marker beacon radiates upwardly a fairly extensive signal field having a general balloon-like shape, as indicated in Fig. 2a. The marker beacon gives a signal to a marker beacon receiver on the aircraft, the receiver being connected to the sequence selector stepping circuit to step the selector to point 6. The selector now makes connections effective to hold the constant altitude control unit in operation, to hold the power setting of final approach I in effect (22 inches of mercury manifold pressure), and to connect the localizer receiver signal to the auto-pilot through the automatic approach coupling. The localizer receiver picks up signals from a standard runway-localizer station located beyond the runway and on the axis thereof. The signals from the station are as usual mechanically modulated to two different frequencies of 90 and 150 cycles and are radiated by an antenna array to form two elliptical signal fields overlapping in a narrow zone coincident with the axis of the runway. The localizer signals as received on the aircraft may be used to hold a vertical indicator needle in a center or on-course position, but in the present system the signals are fed additionally through the automatic approach coupling to the auto-pilot, thus holding the turn control on a correct runway approach position.

7. *Final approach III*

The constant altitude approach phase is maintained until the aircraft reaches the inner marker beacon, at which time the marker beacon receiver will actuate the sequence selector stepping circuit to step the selector to point 7. With the selector in this position circuits are completed to the power control unit, to the localizer receiver and to the glide path receiver. The two receivers are of course connected to the auto-pilot through the automatic approach coupling, as indicated in Fig. 1. The power setting will be reduced to about 16 inches of mercury manifold pressure for the approach glide, and the glide angle as determined by the glide path control will be about 2.5 degrees. The localizer receiver will hold the auto-pilot on a runway heading, as in the final approach II.

The glide path signal which is ordinarily fed from the glide path receiver to an indicator having a normally horizontal needle for visual aid in holding the aircraft on the correct glide path, is applied in addition in the present system to the auto-pilot through the automatic approach coupling. By this arrangement the auto-pilot can be made to hold the aircraft on the correct glide path automatically. For a discussion of the standard glide path and runway-localizer control systems for instrument approach and landing reference may be had to "Principles of Aeronautical Radio Engineering" by P. C. Sandretto (1942) pages 168 to 197, published by McGraw-Hill Book Company. The antennas gineering Handbook" by Keith Henney (third edition, 1941) pages 616 to 620, published by McGraw-Hill Book Company. The antennas required to receive the glide path and localizer signals are shown in present Fig. 8. That for the glide path receiver is a di-pole antenna comprising oppositely extending rods mounted in a central insulator, each rod having a separate lead extending down inside the insulator to the aircraft interior. The localizer antenna is also of the di-pole type, comprising two horizontal branches together forming a U-shaped structure. Separate leads from these branches also extend down through the insulator carried on the aircraft.

8. *Landing*

The glide approach to the runway is continued until the nose-wheel and main wheels touch the runway. The aircraft weight is then taken by the wheel struts, which are made of two telescopic sections forming hydraulic chambers to permit absorption of landing shock. The struts themselves shorten in absorbing shock and consequently the hinge point of the two links used to prevent relative rotation of the strut sections (Fig 8) moves away from the strut. By means of a Bowden wire connected from micro-switches to the hinge point of the links the micro-switches are opened to again actuate the sequence selector stepping circuit, stepping the selector to point 8. The selector in this position closes circuits to hold the runway-localizer control, the glide path control and to initiate the brake control through a time delay circuit. The brakes are applied after a time interval of four seconds and the brakes are applied differentially in the two main wheels by means of a follow-up control operated by the rudder cables. This combination of controlls acts to guide the aircraft along the runway in response to the runway-localizer control. The selector also completes a circuit to select a new power setting for idling, the manifold pressure at this time being in the neighborhood of 10 inches of mercury. The glide path control is useful even after touchdown, since the standard glide path receiver includes an alarm circuit utilized in the present system to feed an up signal when the glide path signal field has been passed. By this control action the tail of the aircraft is held down for a smoother, safer landing.

Master sequence selector

The general plan of the aircraft control system as described above is relatively simple but the workable embodiment becomes a complex circuit or combination of circuits, as may be seen by reference to Figs. 3, 3a, 4, 5, 7 and 10. The master sequence selector as shown in Figs. 3 and 3a is a ten gang, twelve position rotary switch in which each gang comprises a disk of insulating material concentrically fixed with respect to the others and stationary with respect to a central rotary shaft. Adjacent to each disk there is a metallic plate keyed on the shaft and having a spring finger adapted to engage only a single contact of the adjacent disk at a time. The twelve positions of the switch correspond to twelve contacts secured to the periphery of each disk. Thus various circuits may be completed through contacts to the metallic plates, each of which forms a common terminal for the individual selector gangs. The selector shaft extends beyond the selector gangs at one end to a selector stepping device which operates to engage a ratchet wheel keyed on the shaft, to step the selector one step at a time. The other end of the selector shaft is extended through a control panel and carries thereon a pointer and a knob. The pointer is adapted to indicate on the face of the panel the position of the selector at all times. The knob is useful to step the selector from the last active step (point 8) around to the beginning (point 0), preparatory to take-off.

While the details of the sequence selector form no part of the present invention, the stepping device for the selector may be described as a short stroke solenoid or electromagnet, the armature of which carries a dog or tooth engageable with the ratchet wheel to step the selector only one step at a time in only one direction each time the solenoid circuit is closed. The actual details of the selector may be varied, but the above description should convey a clear understanding of the type of switch required and even the construction which may be used. A similar type of switch having fewer contacts is disclosed in the patent to Crane et al (Fig. 16a) referred to above.

In Figs. 3 and 3a the selector drive shaft is omitted but as in the actual switch a separate contact means is shown at the left hand side of each disk for continuous contact with the associated central plate having a contact finger thereon. Referring to Figs. 3 and 3a the separate selector gangs of sequence selector 1 are indicated by numerals 1a to 1j respectively. The insulating disks 2a to 2j carry the peripheral sets of equally spaced contacts which may be designated by the selector stations, numbered 0 to 11. These contacts are engageable by the spring fingers on the separate gang plates 3a to 3j, the plates being driven together as a group by a central shaft which is insulated from the plates to prevent cross connections between the separate gangs. Each of the plates 3a to 3j is continuously engaged by a brush 4a to 4j, to which may be soldered a conductor. Thus each station or point on the sequence selector may be arranged to close a separate circuit for each selector gang present in the sequence selector. For instance at station 1 the gang 1c closes a circuit from ground to brush 4c, to plate 3c, to contact 1 of gang 1c and thence by a wire to magnetic relay RE-3 and also to time delay relay TR-1 (Fig. 3a). The 0 station of the sequence selector is used as a no-circuit or idle position, the selector normally occupying this station when the control system is not in operation.

As shown in Fig. 3 the sequence selector is adapted to be rotated one step at a time by means of a stepping circuit SC. The stepping circuit includes a solenoid which is adapted to be supplied with a 24 volt potential through actuation of a relay included in the stepping circuit. The solenoid has an end portion which by engagement with a ratchet wheel on the selector shaft is adapted to step the selector from one point to the next with each actuation of the solenoid.

Control system circuit

Referring to Figs. 3 and 3a for a wiring diagram of the present control system, the arrangement of selector gangs, relays and switches is shown whereby the various units making up the control system are connected into a complete and integrated flight controller. Also shown diagrammatically in Fig. 3a are the marker beacon receiver coupling MBRC and the air log device, comprising air log spinner ALS and air log counter ALC. Some of the circuit lines extend from Fig. 3 to Fig. 3a and will be identified hereinafter as trunk lines 1 to 16. All magnetic relays are designated by the symbol RE and in each instance they are illustrated in a position when the relay holding coils are not energized. The separate selector gangs function to complete various circuits, some being exclusively identified with certain parts of the system. For instance the gang 1a governs the power control circuit, gang 1e governs the selector stepping circuit, and gang 1j governs the selector station indicator.

The circuits completed by the first and last gangs may be disposed of at this point by stating that the circuits for gang 1a are described in detail under the heading of "Power control" hereinbelow. The gang 1j merely serves to connect a series of signal lamps located on the system control panel, so as to indicate by a single lamp for each selector station the particular station or point in effect at any time during the flight, thus giving the flight engineer a means of checking on the operation of the selector. The circuits which are completed at each step of the selector will now be described in separate paragraphs numbered from 0 to 8.

0. The zero point of the master sequence selector provides no circuits through the selector gangs since the plate contacting brushes 4a to 4j are located at this point, and the spring fingers on the plates will also be at the zero point. However at the zero point, or at any other point, the push-button switch SW-1 is adapted to close a circuit to the relay of selector stepping circuit SC. Closing the circuit to the relay actuates the stepping solenoid once to move the selector gangs to point 1, the gang plates 3a to 3j being driven together as a unit by a central shaft.

1. The selector having reached point 1, the gang 1c makes a ground circuit through relay RE-3 to relay RE-4 and thence by trunk line 7 to the holding coil of relay RE-9. The latter relay is then actuated to connect the brake circuit terminals BR-1 and BR-2 together through the time delay relay TR-2. The latter is a normally open type of relay but as soon as electric power is applied to the control system the heating coil or other timing element of the relay TR-2 is connected to the 24 volt direct current source through the trunk line 8, relay RE-4, the trunk line 9 and thence to ground through relay RE-6. The electric power supply having been connected to the system several minutes prior to initiating the system control, the relay TR-2 has ample time to reach closed position since both time delay relays (TR-1 and TR-2) have a time factor of four seconds both on closing and opening. Both of these relays are also of the normally open type, that is with the heating coil or timing element deenergized the relays make no circuit connections. With brake terminals BR-1 and BR-2 connected together the brakes are set while the engine turns up to full power, take-off or maximum power having been applied by means of selector gang 1a. At the same time the brake terminals are connected together, a circuit is completed to the heating coil of time delay relay TR-1 by means of trunk line 5 which is grounded through selector gang 1c. After four seconds the relay TR-1 closes to complete a circuit to the holding coil of relay RE-6, the latter relay assuming an upward position to break the ground connection to trunk line 9. The 24 volt circuit of the heating coil of time delay relay TR-2 is now open and the relay itself opens in about four seconds, thus breaking the circuit between brake terminals BR-1 and BR-2 to release the brakes accordingly. Because of the additive effect of the two time delay relays the brakes are thus held for eight seconds after the selector reaches point 1. The selector gang 1h makes a circuit from terminal 1 of terminal block TB-2 through trunk line 11 to the selector gang and thence out on trunk line 6 to relay RE-2 and on to the up signal source, comprising the upper half of resistance bridge circuit RBC. Thus through the terminal block TB-2 an up signal reaches the auto pilot, the circuit completed through the selector gang 1h being equivalent to closing the manual switch SW-3 on the UP contact as shown. Since power as supplied by the engine to the propeller is now full on the aircraft proceeds down the runway and takes off. The auto-pilot is so constructed that it holds the aircraft on the correct runway heading, so that the take-off proceeds with correct runway orientation. This feature will be explained further under the section entitled "Automatic pilot."

2. When the aircraft has reached an altitude of 1000 feet the aneroid switch PS-1 closes, to energize the holding coil of relay RE-1. This relay closes a circuit from ground to point 1 of the selector gang 1e and thence through the gang connections to the relay of stepping circuit SC. The relay then closes to actuate the stepping circuit solenoid and move the selector to point 2. At point 2 the gang 1b makes a circuit from ground to the holding coil circuit of relay RE-1, to hold the relay contactors in the upward position regardless of the circuit closed by the aneroid switch PS-1. This is important because of the fact that the aircraft may not hold its altitude immediately after the switch PS-1 closes, since raising the wheels and wing flaps will usually bring about an adjusted trim condition of the aircraft controls. At this time the two lowermost contactors of relay RE-1 are in the upward position to close circuits between terminals 1 and 2, and 4 and 5 of the terminal block TB-1. This action completes the circuits required to raise the landing gear and the wing flaps. The latter elements are operated by means of reversible direct current motors operating on the 24 volt D. C. source available on the aircraft. The selector gang 1h makes exactly the same connections as described in the preceding paragraph, to maintain the climb condition of the aircraft.

3. When the aircraft has reached the 4000 foot cruise altitude the aneroid switch PS-2 closes, thus energizing the holding coil of relay RE-2 and through this relay closing a circuit from ground to point 2 of the selector gang 1e. The brush 4e being connected to the stepping circuit relay holding coil, the relay is operated to close the stepping circuit solenoid circuit and once again step the selector which will now be at point 3, to begin the cruise phase of the flight plan. The gang 1b continues to hold the relay RE-1 in the upward position, while gang 1c similarly acts to hold the relay RE-2 in the upward position regardless of the circuit closed by the aneroid switch PS-2. The gang 1d through relay RE-1 acts to connect the constant altitude control unit of the auto-pilot, which takes effect at any altitude at which it is turned on to hold the aircraft in level flight at that altitude. The selector gang 1g closes a circuit to the holding coil of relay RE-15, thus closing the relay upwardly and completing a circuit from the automatic approach coupling AAC to the synchro-control transformer SCT. The latter is connected to the gyro-compass repeater associated with the auto-pilot and is similar in construction to a self-synchronous unit except that the rotor is relatively stationary with respect to the stator. The rotor can however be pre-set in any rotative position to provide a desired magnetic heading signal for the auto-pilot, the signal being fed from the synchro-control transformer rotor through the automatic approach coupling and into the automatic pilot. The pre-set heading in the present example is selected to direct the aircraft toward the first radio compass station (or nondirectional radio beacon). The relay RE-15 also connects the air log spinner ALS to the air log counter ALC. The counter unit ALC includes a counter-stepping circuit which is actuated a number of times during each air mile by a contact arrangement in the air log spinner unit, the latter being driven by a propeller located in the air stream outside the aircraft structure. It is also noted that selector gang 1i closes a circuit from trunk line 15 connected to terminal 2 of terminal block TB-2 to trunk line 13 connected through relay RE-1 to terminal 1 of terminal block TB-2. The purpose of this connection will be explained below under the section entitled "Automatic pilot."

4. When a pre-set mileage has run out the cruise phase of the flight is almost complete, and the air log contact wheel ALCW closes a circuit from ground to the trunk line 10 and thence to point 3 on gang 1e to operate the selector stepping circuit and move the sequence selector to point 4. At this point the gang 1b will continue to hold the relay RE-1 in the upward position. The gang 1c acts through the trunk line 5 to complete a circuit to the heating coil or other timing circuit of time delay relay TR-1. The relay TR-1 being normally open, the relay RE-6 will be in the downward position until the timing circuit of relay TR-1 takes effect in four seconds to close the holding coil circuit of relay RE-6. Thus immediately on reaching point 4 the gang 1f will complete a circuit through trunk line 3 and relay RE-6 to the holding coil of relay RE-10. The latter relay then closes the tuning circuit TC-1 forming a tuning channel of the radio compass tuner previously mentioned and further referred to below under the section entitled "Radio compass." The radio compass is thus tuned automatically to the frequency of the first radio compass station. After four seconds the timing circuit of time delay relay TR-1 acts to close the relay and energize the holding coil of relay RE-6, the latter taking an upward position and breaking the circuit to the holding coil of relay RE-10. The latter relay assumes its downward position, thus breaking the compass tuning circuit TC-1. It is of course understood that the tuning of the compass will be undisturbed until another compass tuning circuit is energized. The radio compass output is connected to the automatic approach coupling unit of the auto-pilot by means of the radio compass relay RCR, which takes effect at point 4 of selector gang 1g. The complete relay and connections for the relays RCR, LRR and GPRR are not shown, but it is understood that energizing of the relay holding coils of relays RCR, LRR and GPRR closes circuits which connect the output signals of the radio compass, the localizer receiver and the glide path receiver to the automatic approach coupling. It is also noted that the selector gang 1i closes a circuit from terminal 2 of terminal block TB-2 to terminal 1 of the same terminal block, as in the previous paragraph. Noting again gang 1c it should be explained that the trunk line 5 does not connect with the trunk line 7 through relays RE-3 and RE-4, since the holding coil of the latter relay is energized when the aircraft is off the ground. The nose wheel micro-switch MS-1 and the right wheel micro-switch MS-2 are both closed when the weight of the aircraft is off the landing gear, therefore the holding coils of relays RE-4 and RE-5 are energized during free flight and the relays are in the upward position accordingly.

5. On approaching the location of the first non-directional radio beacon under the influence of the homing signal received therefrom, the marker beacon receiver picks up the Z-marker beacon signal and passes it through the marker beacon receiver coupling MBRC to be described below under a separate heading. The coupling output is passed by trunk line 1 to point 4 of gang 1e to once more step the selector to a new station (point 5). The construction of the marker beacon receiver coupling precludes further stepping of the selector at this time even though the gang 1e still makes a connection through trunk line 1 to the receiver coupling. The gang 1c is now connected to the trunk line 16 to close a circuit to relay RE-7, and thence to the holding coil of relay RE-11. The latter closes to operate the radio compass tuning circuit TC-2 and tune the radio compass to the frequency of the second radio compass station. The same trunk line 16 extends to the holding coil of relay RE-14, and energizing this relay closes the ground connection from gang 1c to the timing circuit of time delay relay TR-2. After four seconds the relay TR-2 closes, completing a circuit through relay RE-9 to the holding coil of relay RE-7. The relay RE-7 now moves to the upward position to break the holding coil circuit of the tuning circuit relay RE-11, resulting in a break in the radio compass tuning circuit TC-2. The gang 1g also makes a connection to the radio compass relay RCR to connect the compass output into the auto-pilot by way of the automatic approach coupling. The selector gang 1h now makes a connection from terminal 1 of terminal block TB-2 by way of trunk line 11 and trunk line 12 to relay RE-1 and to the lower or down signal side of resistance bridge circuit RBC. The bridge having been pre-set for a desired signal the aircraft begins the initial approach glide, which continues at the reduced power setting obtained by selector gang 1a until the aircraft reaches 1000 feet, at which time the aneroid switch PS-1 opens. The switch PS-1 being open the holding coil of relay RE-1 becomes deenergized and the relay assumes its downward position. This makes a circuit from gang 1d to the constant altitude control unit of the auto-pilot, so that the aircraft levels off at the corresponding altitude (1000 feet in this example). The relay RE-1 also makes connections between terminals 2 and 3, and 5 and 6 of the terminal block TB-1 thus connecting the motors for the landing gear and wing flaps to lower these elements. The relay RE-1 breaks the connection to the down signal portion of resistance bridge circuit RBC, and by means of selector gang 1i now makes a connection through trunk lines 14 and 15 across the terminals 1 and 2 of the auto-pilot terminal block TB-2.

6. Continuing the flight at about 1000 feet of altitude with a heading directly toward the second nondirectional radio beacon the aircraft comes in over the beacon (radio compass station) at which point there is an outer marker beacon radiating a balloon-shaped signal field upwardly. When the aircraft reaches this signal field the marker beacon receiver picks up the signal and passes it to the marker beacon receiver coupling MBRC, the latter producing an impulse through gang 1e to operate the selector stepping circuit SC and step the selector to point 6. At this station the gang 1d makes a connection to the constant altitude control, so as to hold the 1000 foot altitude in effect. The gang 1f completes a circuit through trunk line 2 thus actuating the holding coil of relay RE-12 through relay RE-8 and operating the tuning circuit TC-3. This action merely tunes the radio compass to a new wavelength for directional control of the aircraft in the ensuing phase of the flight. In the present example this would be useful only if the aircraft is to home on a third radio compass station, located on the approach path to the landing field. The circuits completed by gang 1f and trunk line 2 include one to the holding coil of relay RE-13, the latter closing upwardly to start the timing circuit of time delay relay TR-1. The latter closes after four seconds to energize the holding coil of relay RE-8 and break the tuning circuit TC-3, the frequency tuner of the radio compass having had ample time during this interval to tune the gang condenser of the compass circuit. In the present aircraft control system the preferred means of directional control during the approach phases following the second radio compass station is the runway-localizer control. It should be understood that the system is flexible enough to substitute the radio compass directional control for runway-localizer control. However it is found that the localizer signals carry far enough from the landing field to make possible directional control from the outer marker beacon on into the field. As may be seen from Fig. 2a this distance may be in the neighborhood of fifteen miles, although the distances there indicated are stated by way of example only. Since the gang 1g at point 6 makes a connection to the localizer receiver relay LRR, the relay closes a circuit to connect the receiver signal into the automatic approach coupling from whence the directional signal goes to the automatic pilot. The standard localizer receiver is not modified in any way, its signal being used in the present case to give an automatic directional control instead of merely operating a left-right needle of an indicating device. The gang 1i at point 6 connects together the trunk lines 14 and 15, thus connecting the terminals 1 and 2 of the auto-pilot terminal block TB-2.

7. On reaching the inner marker beacon the signal emitted generally upwardly therefrom is received by the marker beacon receiver and through the marker beacon receiver coupling MBRC an impulse is passed on to the selector stepping circuit to step the selector to point 7, the impulse reaching the stepping circuit by way of the trunk line 1 and gang 1e. With the selector now at point 7 circuits are completed by the selector gangs 1a (power control), 1f, 1g, 1i and 1j (selector station indicator). The gang 1f completes a circuit to the glide path receiver relay GPRR, which closes a circuit for connection of the receiver signal to the automatic approach coupling from whence the correct down signal is fed to the automatic pilot. The standard glide path receiver is not modified for use in the present system but its signal is used to hold the aircraft on the glide path automatically, instead of merely operating a normally horizontal needle of an indicator. The gang 1g completes a circuit to the localizer receiver relay LRR to hold the runway-localizer control, which was initiated at the beginning of flight phase 6 under the preferred flight plan. Through gang 1i the trunk lines 14 and 15 are connected together, thus connecting terminals 1 and 2 of the auto-pilot terminal block TB-2 through the relay RE-1.

8. The micro-switches MS-1 and MS-2 are actuated by Bowden wires connected to the folding links or "nut-crackers" carried on the nose wheel strut and right wheel strut respectively. These links L1 and L2 are shown as used on the nose wheel strut in Fig. 8. The Bowden wire connects to the link connection J so as to be put under tension when the links fold closer together. On touchdown of the aircraft the switches MS-1 and MS-2 are opened, this causing the holding coils of relays RE-4 and RE-5 to become deenergized. When relay RE-4 reaches the downward position the circuit to the heating coil of time delay relay TR-2 is completed through trunk lines 8 and 9 and relay RE-6. The relay TR-2 closes after four seconds to connect the contactors of relay RE-9 together. Opening of microswitch MS-2 and disconnecting of the holding coil of relay RE-5 completes a circuit to the relay of stepping circuit SC by way of relay RE-5, relay RE-4, relay RE-3 and selector gang 1e. Closing this circuit then steps the selector to point 8 by means of the stepping circuit solenoid. The gang 1j in this instance has a function in aircraft control, since at point 8 the trunk line 4 makes a connection to the holding coil of relay RE-3 and to ground through selector gang 1j. The relay holding coil now moves the relay RE-3 to the upward position, closing a circuit from ground to the trunk line 7 by way of relays RE-3 and RE-4. Since line 7 connects to the holding coil of relay RE-9, the latter relay closes in the upward position to complete a circuit across brake circuit terminals BR-1 and BR-2 through relay TR-2. The latter relay becomes closed four seconds after touchdown, as explained above. The brakes are now in the "on" position and the aircraft will come to a stop gradually, as will be more fully described below under the heading of "Brake control." At point 8 the gang 1f holds the glide path receiver by means of the glide path receiver relay GPRR. At point 8 the gang 1g holds the localizer receiver by means of the localizer receiver relay LRR. The gang 1i connects the trunk lines 14 and 15, which as explained previously has the effect of connecting terminals 1 and 2 of the terminal block TB-2. The purpose of holding the glide path receiver is that the standard receiver includes an alarm circuit adapted to produce an up signal when the aircraft moves out of the glide path signal field. This up signal when fed to the auto-pilot has the effect of holding the tail of the aircraft down, thus preventing nosing over and giving a smoother landing. The alarm circuit is normally present in the receiver to give a sudden upswing to the glide path indicator needle, and serve as a warning that the aircraft has strayed from the correct glide path. In the present system the alarm circuit signal is utilized only to give an up signal to the auto-pilot after landing of the aircraft and after the aircraft has rolled past the glide path station (Fig. 2a), where it will be out of the glide path signal field. Moreover if it should be found advisable to again take off without rolling to a stop, the up signal will act to get the aircraft into the air upon application of full power by manual control.

In the circuit diagram as shown in Figs. 3 and 3a the elements of the system are shown in schematic form. The altitude signal transformer AST, the resistance bridge circuit RBC and the terminal block TB-2 will be further mentioned below in the section entitled "Automatic pilot." The aneroid switches PS-1 and PS-2 are provided with adjustment means, so that the cruise and intermediate altitudes may be changed within liimits. This is especially useful when the aircraft is on an extended series of flights and making use of air fields having various altitudes above sea level. The switch setting dials, preferably located on the control system panel, may be calibrated in millibars or any suitable pressure units. The manual switch SW-2 is adapted to be set on either of the contacts AP or AF. On the contact AP the auto-pilot is used in the normal and well-known manner, and on the contact AF the auto-pilot is connected for use in automatic flight according to the present control system. The manual switch SW-3 is normally off both contacts UP and DOWN, and is for use only in an emergency where manual control of some phase of the flight is necessary. The time delay relays TR-1 and TR-2 may have any reasonable time factor, but the four second timing above described has been found very satisfactory under average conditions where the control system is employed on a C-54 transport. Before use of the control system all electric power sources are turned on and all vacuum tube circuits are connected to the proper sources, so that the tubes may warm up and the circuits may reach a steady operating condition. This includes the power supply to the radio compass, the marker beacon receiver, the localizer receiver and the glide path receiver, even though the signals therefrom are not utilized except at specified times. In passing it might be noted that the receiving antennas for the localizer receiver, the glide path receiver and the marker beacon receiver are designated in Fig. 8 at LRA, GPRA and MBRA respectively. In the same view there is also shown the radio compass loop RCL and the radio compass sense antenna RCSA. In the circuits as covered by Figs. 3 and 3a, as well as in other circuits shown in the drawings, the parts indicated as connected to ground are tied to the metal framework of the aircraft. Also one side of the electric power sources are similarly grounded. Thus in connecting any part of the system to power, only a single line to the power source is required plus another line to any portion of the metal aircraft framework.

*Power control*

The power control portion of the present system is illustrated diagrammatically in Fig. 4, and the automatic air speed control unit of Fig. 4 is shown in detail in Fig. 6. It should be understood that the power control as illustrated and described is applicable to a plurality of engines or combustion motors, even though described in connection with a single engine D adapted to drive a propeller E. When more than one engine is used the control system is preferably duplicated for each engine, so that the separate power units are independent except for an engine synchronizer which is usually employed on multi-motor aircraft.

The power control may be divided roughly into six parts as follows: the motor unit F, the pressuretrol G, the signal control unit H, the power selector I, the automatic air speed control J, and the selector gang 1a. The selector gang 1a forms the first gang of the master sequence selector 1 (see Fig. 3), the various power selections being set into the power selector I as the flight proceeds. The comparative values for the power settings at each phase of the flight have been stated previously in terms of the manifold pressure.

The motor unit F includes a throttle servomotor 10 and a motor follow-up potentiometer 11. The motor 10 is a two-phase reversible induction motor of the squirrel-cage type, and has two field windings as indicated in Fig. 4. The rotor of the servomotor is mechanically connected by suitable reduction gearing to the follow-up potentiometer 11 and to the throttle cable control wheel 12. A substantial gear reduction is used between the motor 10 and the driven elements 11 and 12, so that a very small motor may be used. A suggested ratio between the motor and the driven elements is 1500 to 1, although this may vary widely according to the motor design and relative proportions of the parts to be driven. In order to permit movement of the cable 13 independently of the motor and gearing when the manual throttle control (not shown) is to be operated, the throttle cable control wheel 12 is made of two concentric sections having a clutch means for combined rotation of the sections. The clutch means may comprise spring detents slidably mounted within the inner section and engageable with notches formed on the inside edge of the outer section. This simple drive clutch will permit the control cable 13 to be moved without operation of the servomotor and gearing, and will also provide an adequate driving connection for the cable from the servomotor.

The cable 13 extends over and around the pulleys or quadrants 14 and 15, the pulley 14 being mounted on the throttle valve shaft 16 adjacent to the carburetor 17. The air and combustible fuel is taken into the engine through conduit 18, through the blower 19 and then into the intake manifolds 20 leading to the engine cylinders. The blower unit 19 being geared to the engine increases in speed as the engine speeds up to augment the suction effect of the moving pistons of the engine. As the throttle valve is opened up the intake of air increases in volume and the quantity of fuel drawn from the carburetor 17 increases proportionately, thus stepping up the speed and the power output of the engine D. In communication with the manifold 20 is a pressure sensitive device termed pressuretrol G. The pressuretrol includes a motion increasing lever and gear system to operate a potentiometer included in the assembly. By sensing the manifold pressure the pressuretrol is adapted to electrically control in automatic fashion the manifold pressure, as well as the power developed by the engine D.

The power control circuit comprises chiefly the servomotor 10, the follow-up potentiometer 11, the pressuretrol potentiometer 21, the signal control unit H, the power selection resistor 22, the ratio control potentiometer 23, the power selection relay 24, the manual power selector 25, the sequence selector gang 1a, and the power transformers 26 and 27. The various potentiometers and resistors above named provide signal potentials which are amplified and transmitted to the motor 10, to produce the resultant motor rotation. As each tap of the power selection resistor or voltage divider 22 is selected the manifold pressure changes until the voltage introduced from that source is balanced out by the voltage produced by the pressuretrol potentiometer 21. The throttle setting then has reached a steady state and changes very little until the electrical balance is disturbed.

Considering the circuit in detail the transformer 27 is supplied with 115 volt alternating current. The transformer output provides reduced potentials for the motor follow-up potentiometer 11 and for the pressuretrol potentiometer 21. The wiper connection of the potentiometer 11 feeds a signal to the control unit H tending to cancel the signal producing the motor and potentiometer movement, whereby the potentiometer signal was developed. Thus the follow-up potentiometer acts to prevent over travel of the motor, since at the time the potentiometer movement is sufficient to make the two signals equal and opposite the control unit output to the servomotor cuts off and the motor stops.

The power selection resistor or voltage divider 22 having an A. C. source in parallel therewith is provided with a series of taps each connected to a movable contactor of relay 24. The relay contactors have an upper position where they are held by a tension spring, and a lower position where they are held by the holding coil of relay 24. In the lower position four of the taps are connected to contacts of manual power selector 25. In the upper position the taps are connected to points on sequence selector gang 1a through which they make a connection to ground. The switch 28 acts to energize the holding coil of relay 24 when manual control of power is desired. Since point 1 on the sequence selector is the maximum or take-off power it can be seen that the lower taps of the divider 22 will determine reduced power settings. The ratio control or calibrator 23 permits adjustment of idling power setting, and it is also across the calibrator resistor that the automatic air speed control signal is fed.

The voltage drop across the divider and calibrator are fed to the moving contact or wiper of the pressuretrol potentiometer 21. The latter is connected in series with a 500 ohm resistor, both being across the 30 volt winding of transformer 27. The signal fed into the wiper of potentiometer 21 may be augmented or reduced according to the position of the wiper, but the resultant is fed through the 6 volt winding of the bridge transformer 27 to the follow-up potentiometer bridge formed by a portion of transformer 27 and the potentiometer 11. The wiper of the potentiometer 11 feeds the total signal to the control unit H, where the signal is amplified and fed to a discriminator circuit involving two 7C5 tubes. These two tubes provide two signal channels which determine the relative direction of servomotor rotation, or when a balance is achieved no signal is passed in either channel and the motor stops.

The right hand or line excited winding of the motor 19 is connected to the 115 volt A. C. line through an 0.01 microfarad condenser 29, so as to be one-fourth cycle out of phase with the line voltage. The left hand or signal excited winding of the motor 10 is either in phase with the line voltage or one-half cycle out of phase, and the current therethrough will either lead or lag the line current by one-fourth cycle. Thus the phase relation of the control unit output will control the direction of motor rotation, or when no signal is produced the motor will be stationary.

When the bridge circuit involving potentiometer 11 and transformer 27 is thrown out of balance by a signal from the power selection resistor 22, the calibrator 23 or the pressuretrol potentiometer 21 the bridge then feeds a signal to the control unit H from the wiper of potentiometer 11. When the bridge is unbalanced in one direction the signal from the bridge is in phase with the plate voltage of one discriminator tube (7C5) allowing the signal to reach the servometer therethrough and drive the motor in one direction. With the bridge unbalanced in the other direction the opposite set of conditions will obtain and by the action of the other discriminator tube (7C5) the motor will turn in the other direction. When the bridge becomes balanced by movement of the wiper of follow-up potentiometer 11 neither of the tubes 7C5 will conduct and the motor will stop. While the output of the tubes 7C5 is in the nature of a pulsating direct current, an 0.2 microfarad condenser 30 is connected in parallel with the signal excited winding of the motor 10 to form an oscillator circuit and thus provide an alternating current capable of operating the servomotor.

The automatic air speed control illustrated in Fig. 6 includes a variable coupler 31 having a stator 32 and a rotor 33. The stator is mounted on a base 34 for limited rotary movement about the center of the coupler, this rotary adjustment being effected by means of the lead screw 35 which carries a knob for manually adjusting the stator setting. The stator windings are connected to the 115 volt A. C. line and the electrical energy transferred from the stator to the rotor appears as an A. C. potential in the rotor winding. The rotor winding terminals R1 and R2 make connection across the calibrator resistor, as shown in Fig. 4, thus feeding a signal into the power control circuit. It should be understood also that the stator 32 and rotor 33 are of iron or other magnetic material so that the flux density is a maximum. The air gap between the stator and rotor pole pieces should also be reduced to a minimum, since air has a very high magnetic reluctance. The rotor is adapted for rotative movement about a central shaft by means of a pinion 36 and a gear sector 37, the latter being actuated by a pinion 38 and a rack bar 39 connected to the movable end of a bellows 40. The bellows 40 is fixed at its upper end to a support and has leading to the bellows interior a conduit 41 connected to a Pitot tube located in the free air stream adjacent the leading edge of the aircraft wing, or at any other suitable location. Increase in air speed will cause increase in the pressure within the bellows which then expands to rotate the rotor 33, thus changing the coupling effect and changing the strength of the coupler output to the calibrator resistor.

In operation of the aircraft control system the variable coupler 31 is used in conjunction with the calibrator 23 to adjust the idling speed of the engine, as well as to limit to some extent the speed of the aircraft in glide phases of the flight. For instance on a C-54 transport the air speed control setting enables the air speed to be maintained around 160 miles per hour on the initial glide from cruise altitude and around 120 miles per hour on final landing glide. The amount of stator adjustment by screw 35 as well as the amount of rotor movement by means of the bellows is not very extensive at any time, but small angular displacements of the rotor and stator relative to each other result in considerable variations in coupling effect between the coupler elements. While an inductive coupling is illustrated for obtaining automatic air speed control other equivalent devices maye be substituted if desired. For instance it is possible to use a potentiometer type of signal source, with the wiper of the potentiometer being adapted for actuation by the Pitot tube pressure atcing on a bellows, exactly as in Fig. 6.

*Brake control*

The automatic control of brake action on the right and left wheels of the aircraft is obtained by means of circuits completed to the brake operating system at the proper times. The operating system is shown in some detail in Fig. 5. It will be noted in Fig. 5 that two brake terminals BR-1 and BR-2 are provided, which correspond to similar terminals as included in Fig. 3a. By merely connecting these two terminals together the desired brake action is obtained as will appear in the following description.

The brake control system as shown in Fig. 15 comprises principally eleven units, which are; the brake actuators K and K', the brake follow-up couplers L and L', the balanced solenoid valves M and M', the rudder follow-up coupler N, the manual sensitivity coupler O, the decelerometer coupler P, and the electronic valve control units Q and R. The wheel brakes, which are not illustrated, may be of any desired form adapted for actuation by a pull on brake cables 50 and 50', which are connected to pistons 51 and 51' capable of moving back and forth in the servo cylinders 52 and 52'. These cylinders have connected near the upper ends the oil pressure lines 53 and 53', which furnish oil under pressure to force the pistons 51 and 51' downward and exert a pull on cables 50 and 50'. The oil lines 54 and 54' connected to the lower ends of the cylinders 52 and 52' furnish oil under pressure to move the pistons upwardly in response to action of the solenoid valves M and M', thus releasing the tension on the brake cables.

For an understanding of the structure and operation of the balanced solenoid valves M and M' the left-hand unit will now be described in detail, it being understood that the two valves are alike in construction. The left-hand valve M comprises a cylinder 55 within which is slidably mounted the slide valve assembly 56. The assembly 56 includes a central rod 57 having enlargements 58, 59 and 60 slidably engaging the wall of the cylinder 55 and acting to open and close various valve ports in the upper side of the cylinder. The free ends of the rod 57 extend into the solenoids 61 and 62 which are arranged to act in opposition for giving the balanced valve action desired. Fixed on the rod exteriorly of the cylinder there are a pair of abutment plates 63 and 64, between which plates and the cylinder end walls are located light compression springs tending to return the assembly 56 to the central position as shown. The conduit 65 supplies oil under pressure to the valve cylinder by way of a valve port 66, while the oil return form the valve is by way of valve ports 67 and 68 communicating with the branched conduit 69.

Movement of the brake actuating pistons 51 and 51' is followed by links 70 and 70' which are connected to the follow-up couplers L and L' by means of arms 71 and 71', the latter being adjustably secured by set screws to the shafts forming parts of the coupler rotors 72 and 72'. The couplers L and L' also include stators 73 and 73'. The stators and rotors as illustrated are all of the two-pole type but may have various pole arrangements as found desirable or convenient. The purpose of the couplers L and L' is that of producing a signal upon movement of the brake pistons to cancel out or oppose the signal which caused the piston and coupler movement. This results in smoother application of brakes, similar in effect to the brake action obtained by depressing a brake pedal on an automobile or on an aircraft. As may be seen in the drawing the slide valve assembly 56 may be moved a short distance in either direction from the mid-position to uncover part of port 66, thus allowing oil to enter the valve cylinder 55 and build up pressure in one of the lines 53 or 54 for actuating the brake piston 51 in brake applying or brake releasing direction. At the same time one of the oil return ports 68 or 67 is closed, so that the oil from the port 66 can only provide pressure in the proper oil pressure line 53 or 54. When one oil return port is closed off the other is opened, to permit oil flow to the return conduit 69 from the end of cylinder 52 which is not under pressure.

The rudder follow-up coupler N comprises a rotor 74 and a stator 75, both having a two-pole arrangement like that of the other couplers illustrated. Fixed on the rotor shaft is a lever 76 arranged with its longitudinal axis at a right angle to the longitudinal axis of the rotor 74. The opposite ends of the lever 76 have connected thereto a pair of cables 77 and 78 which make connection to the rudder controls of the aircraft. Since the purpose of the coupler N is that of producing differential braking action on the left and right wheels for steering of the aircraft, the position of the rotor 74 and lever 76 corresponds to a rudder neutral position. Left or right rudder movement away from this neutral position will thus produce inductive coupling between the rotor and stator of the coupler N, the opposite movements being adapted to induce in the rotor windings alternating currents of opposite phase relation. The source of this induced current is the 115 volt 400 cycle power supply which is connected across the windings of stator 75.

On landing the aircraft the speed on the ground becomes less and less with the engine at idling power setting. For this reason directional control of the aircraft by the rudder alone is not practical. However by coordinating brake action of the two main wheels with rudder movements the brake action is effective to give a positive and reliable steering response. In the present aircraft control system the rudder action to give this coordinated steering control is through the autopilot, which is in turn actuated by a signal developed in the localizer receiver, which in turn receives signal impulses from the runway-localizer station at the landing field.

The manual sensitivity coupler O includes a rotor 79 and stator 80, the rotor being directly connected by a shaft (indicated by a broken line 81) to a manual control knob 82, which is preferably located on the system control panel. The rotor 79 may thus be moved in either direction from a no-signal position as shown, and the desired setting may be noted by means of a knob-pointer and semicircular scale. Once a proper sensitivity setting is obtained it is generally not disturbed unless a shorter ground run is desired on landing, or in case the brakes are found to be less responsive as for instance by wearing down of the brake shoes. The stator windings are, as in all the other couplers, connected to the 115 volt 400 cycle power source.

The decelerometer coupler P comprises a rotor 83 and a stator 84. Adjustably secured on rotor shaft by means of a set screw 85 there is a pendulum structure 86 of bellcrank form and having a weight 87 at the lower end of one arm of the structure 86. The other arm of the structure 86 has connected thereto a dashpot 88, the latter being fastened securely to a stationary support 89. The dashpot 88 may be a simple pneumatic check which allows the pendulum to swing freely in the direction of the curved arrow but which provides means to retard return movement of the pendulum to the neutral position shown. Also the extent of movement of the piston within dashpot 88 is such as to prevent movement of the pendulum structure in a counterclockwise beyond the position illustrated. While it is convenient to use the dashpot as a stop means for the pendulum structure 86, it should be understood that any suitable stop device may be employed to arrest pendulum movement in a counterclockwise direction beyond the neutral position. Also the directions of movement described are stated by way of example only, and apply particularly to an installation of the control system in an aircraft wherein the forward direction of aircraft movement is in a direction corresponding to the curved arrow extending from weight 87.

The decelerometer coupler P as described and illustrated prevents a too sudden application of maximum braking force, which might cause nosing over of the aircraft on landing as well as injury to the aircraft personnel. Assume first that the aircraft has rolled along the runway after landing and has reached a point at which the brakes take effect. Also it is understood that the coupler P is mounted in the aircraft with its rotor shaft extending transversely of the aircraft fuselage, so that the plane of pendulum swing is parallel with the longitudinal axis of the aircraft. The brake applying signal having effected movement of the solenoid valves M and M' so as to apply a pull on the brake cables 50 and 50' through the brake actuators K and K', such application of the wheel brakes causes an immediate decelerating effect on the rolling aircraft. This deceleration then causes the decelerometer pendulum structure 86 to swing toward the forward end of the aircraft, such movement being restrained only to the extent that the pendulum must swing about its axis, as indicated by the curved arrow. Since the rotor 83 must rotate with the pendulum structure 86, the coupler P is thus adapted to cause a counter signal to be fed into the brake circuit which tends to cancel out the brake applying signal, and thus the braking action is reduced. The braking action obtained with the brake system is thus self-correcting for automatic prevention of quick stops.

The brake signals originating in the couplers L, L', N, O and P and appearing across the respective rotor windings of the couplers are passed through the electronic control units Q and R. The signal outputs of these control units are applied to the solenoids of the balanced solenoid valves M and M'. The unit Q is identified with the left brake solenoid valve M, while the unit R is identified with the right brake solenoid valve M'. The control unit R is not shown in detail but it should be understood that its components and circuit are the same as that of the unit Q. Also, the leads marked 1 to 8 of the unit Q should correspond exactly to similar leads marked 1' to 8' of the unit R.

Referring now particularly to the electronic control unit Q, this unit comprises the signal input vacuum tube 90 having duplicate cathode, grid and plate elements inclosed within a single envelope. The control unit further comprises the signal output tubes 91 and 92, which provide in conjunction with the control unit circuit separate signal channels for actuating the solenoids 61 and 62 of the valve M and thus provide the balanced valve action desired. Assuming that terminals BR-1 and BR-2 are connected together by means shown in Fig. 3a the action obtained by the circuit Q is as follows. The dual triode 90, acts as a grid control rectifier, the plates of which are connected to windings 95a and 95b of the transformer 95. The other terminals of the windings 95a and 95b connect to ground through suitable load resistors 93 and 94, and these windings are so poled that the voltages on the plates are 180° out of phase. With no signal on the grids of the tube 90 the currents through the resistors 93 and 94 will be equal and the tubes 91 and 92 will thus be equally biased. Therefore the currents through solenoids 61 and 62, which are in the plate circuits of tubes 91 and 92 respectively, will have equal value and the valve M will be held in the central position due to the action of the compression springs in abutment with the plates 63 and 64.

The rotors of couplers O, P and L are connected in series between the parallel connected grids of the tube 90 and ground, the latter connection being by way of the terminals BR-1 and BR-2. The voltage on the grids of the tube 90 is equal to the sum of the voltages produced by couplers O, P and L, plus the voltage across the left-hand half of the secondary of the transformer 96. The amount of braking effect desired can be pre-set by rotation of the rotor 79 of coupler O counterclockwise through an angle of 90° or less. Also if desired the rotor 83 of coupler P may be turned counterclockwise with respect to the pendulum structure 86 and the new adjustment may be secured by the set screw 85. Having made this adjustment the brake signal voltage is then the sum of the voltages produced in rotors 79 and 83.

With terminals BR-1 and BR-2 connected, the voltage induced in the rotors 79 and 83 is applied to the grids of tube 90. Since a common 400 cycle power supply is used on all the elements of the circuit and since the windings 95a and 95b of transformer 95 are poled so that the plate voltages of tube 90 are 180° out of phase, the voltage on the grid of one section of tube 90 will be in phase with the plate potential of that section while the grid and plate potentials of the other tube section will be 180° out of phase. As a result the rectified current of the in phase section will exceed that of the out of phase section. Consequently the voltage developed across the load resistor of the in phase section will be increased and the voltage developed across the load resistor of the out of phase section will be decreased. In the system as shown in the drawing (Fig. 5) the polarities are so arranged that the signal from rotor 79, plus any additional signal from the rotor 83, causes the voltage across load resistor 93 to increase and that across the load resistor 94 to decrease. The resulting increase in negative bias on tube 92 and decrease in bias on tube 91 causes the current through solenoid 62 to decrease and the current through solenoid 61 to increase, thus moving the assembly 56 to the left and applying oil pressure to the line 53 for application of the left brake. In a similar manner the right brake is applied by means of the control circuit R, the brake signal voltage being applied to the input grids of the control circuit R through the series circuit from ground through terminals BR-2 and BR-1, rotor 83, rotor 79, the right-hand half of the secondary of transformer 96 and the rotor 72' of coupler L'.

The follow-up couplers L and L' for the left and right brakes respectively operate in the same way, so that a description of the operation of the left coupler L will suffice. Application of the left brake causes the rotor 72 to turn away from the no-signal position illustrated and this results in a voltage being induced in the winding of the rotor. The amplitude of this voltage is proportional to the extent of movement of the brake actuating piston 51, and the voltage is opposite in phase to the voltage induced in rotor 79 of coupler O. The brake action as brought about by the total brake signal will continue to increase until a stable condition is reached, in which the difference in the voltages in rotors 79 and 72 applied to control circuit Q is just sufficient to maintain the required brake pressure. Of course the rotor 83 may also cause a signal similar to that of rotor 79, but this merely adds to the manual sensitivity voltage from rotor 79. This added voltage is optional, but it is frequently desirable to get a greater signal voltage than is possible by use of the manual sensitivity coupler O acting alone.

If the deceleration of the aircraft is too rapid on braking, the pendulum structure 86 turns the rotor 83 so as to change the voltage induced in the winding of this rotor. If the normal position of rotor 83 is counterclockwise of the center or neutral position shown its voltage is in phase with that of rotor 79 and adds thereto, and if the rotor swings in a clockwise direction on deceleration of the aircraft this voltage will be reduced because of the reduced coupling effect. Also if the rotor 83 swings in a clockwise direction beyond the neutral position illustrated the rotor voltage will then be out of phase with the voltage of rotor 79 and the magnitude of this out of phase voltage will depend on the extent of the rotor movement past the neutral or no-signal position. From the foregoing explanation it is clear that the sum of the voltages induced in rotors 79 and 83, which is applied to the grids of the tube 90 of control circuit Q, is reduced by movement of the pendulum structure 86 in the direction of the arrow adjacent the pendulum weight 87. It is also clear that the resultant effect is to cause a reduction of the braking effect.

In order to obtain a differential braking action which conforms with the rubber movement, a coupler N is provided having its rotor 74 mechanically connected to the rudder controls. Movement of the rudder controls to give a right rudder movement causes a voltage of one phase to be induced in rotor 74 and movement to give a left rudder movement causes a voltage of opposite phase to be induced. These voltages are applied to the primary of transformer 96 and half of the resultant voltage appearing across the secondary winding of the transformer is applied in series with the input circuit of one of the electronic control circuits. The voltage across the other half of the secondary winding is applied in series with the input circuit of the other electronic control circuit. Since the voltages at opposite ends of the secondary winding are of opposite polarity, any voltage induced across this winding by reason of displacement of rotor 74 in one direction will cause the input potential to one control circuit to be increased at the same time the input potential to the other control circuit is decreased. The result of such rotor displacement will be an increase in braking effect on one wheel and a decrease in braking effect on the other wheel. Movement of the rotor 74 in the opposite direction from center or no-signal position will cause reversal of the effects stated, due to a reversal in phase of the voltage induced in rotor 74.

In further explanation of the braking system it might be noted that the couplers L, L', N, O and P should be of the iron-core type to obtain a maximum flux density and a maximum of energy transfer from stator to rotor. It is understood also that the stators are supported so as to be relatively stationary with respect to the rotors. The number of poles used in the couplers may be varied within the limits of logical electrical design, but the arrangement of two poles in 180° relation as shown has proven to be satisfactory. The directions of rotor movement stated in the description have been included only by way of presenting a complete example, but it should be understood that these directions may be reversed by proper and consistent application of the principles of electricity and magnetic induction. Furthermore it is not imperative that the decelerometer unit of the apparatus be mounted so that the pendulum swing is exactly in a fore-and-aft plane, as long as the unit is mounted to give the pendulum a force component in the proper direction. Other changes or variations within the principles of operation outlined above may be made, as for instance a different control circuit in place of the control units Q and R, the use of resistance coupling in place of the inductive couplers L, L', N, O and P, or the substitution of other equivalents for any or all of the brake system components.

Nose wheel steering

During the take-off run the aircraft directional control by means of the rudder is not effective until a fairly high air speed has been reached. Until such time as the rudder can take over the directional control of the aircraft it may be desirable to steer the aircraft in its take-off run by means of a steerable nose-wheel, and in order to provide automatic nose wheel steering there may be included a nose wheel steering apparatus as illustrated schematically in Fig. 5a. Since this feature is considered optional, it was not described in the section covering the "Control system circuit." However its relation with respect to the master sequence selector and other portions of the system will become apparent as the description proceeds.

In order to provide automatic nose wheel steering the electrical circuit of Fig. 5 is modified by the addition of a two-position relay RE-18, the movable contactor and one contact of which are connected in the lead designated Y which extends from transformer 96 to the rotor of the inductive coupler N. Thus as shown in Fig. 5a the relay RE-18 when in the downward position completes the circuit exactly as in Fig. 5 allowing the brake system to operate in its normal manner. However when the master sequence selector is rotated to point 1 for take-off, the selector gang 1d completes a circuit to the holding coil of relay RE-18 thus moving the relay contactor to the upward position. Now the rotor 74 of inductive coupler N is connected in series with the rotor 74' of an additional inductive coupler W, the latter in turn being connected to the terminal 6" of the electronic control unit S. This control unit is not shown in detail since its circuit corresponds in every detail with that of the electronic control unit Q of Fig. 5. The control unit terminals 1" to 8" of unit S corresponds to similar terminals 1 to 8 of unit Q. It is further noted that the brake system is also effective at the first point of the sequence selector to hold the aircraft stationary while the engines develop full power. However for this brake function the directional control coupler N is not necessary in any way, and may therefore be connected to the coupler W instead of to the transformer 96. Once the brakes are released for the take-off run the brake system is out of operation, so that there will be no retarding effect on the aircraft.

The input terminal 6" of the electronic control unit receives a signal from the directional control coupler N when the rotor 74 is turned with respect to the stator 75 in response to rudder movements. The correcting rudder movements on the take-off run are made possible by the automatic pilot which tends to hold the aircraft on its original heading until some new heading signal is fed to the pilot signal system. This is explained further in the section entitled "Automatic pilot." Since the stators 75 and 75' of the inductive couplers N and W are connected to an alternating current source, any movement of the rotors 74 and 74' away from the neutral position as shown in Fig. 5a causes signals to be originated in the rotor windings. The resultant of these signals affects the input section of the electronic control unit S, and depending on the phase relation of this resultant signal the output signals of the unit 5 at terminals 2″ and 3″ are regulated accordingly. These output currents are connected to the solenoids 61″ and 62″ of the balanced solenoid valve M″. The latter is constructed exactly like the similar valves M and M′ of Fig. 5. With the rotors 74 and 74′ of the couplers N and W both in neutral position no signal will reach the input terminal 6″ of the control unit S and therefore the output currents at terminals 2″ and 3″ will be equal. With this condition the solenoids 61″ and 62″ of Valve M″ will be in balanced condition and there will be no movement of the slide valve assembly 56″ away from central or neutral position. In order to supply the power requirements of the control unit S, the terminals 4″, 5″, 7″ and 8″ are connected to the secondary windings 95e and 95f of the power transformer 95. The terminal 1″ is connected to a direct current source (shown as a battery) and this source also connects to one terminal of each of the solenoids 61″ and 62″. The solenoid valve M″ includes a slide valve assembly 56″, fluid inlet 65″, fluid return 69″, and also connects to the pressure conduits 200 and 201 leading to the servo cylinder 202. This hydraulic system may operate at pressures in the neighborhood of 150 pounds per square inch, although the pressure is not critical. The servo cylinder 202 carries a piston 203 having a piston rod 204 attached thereto. This rod includes an adjustable connection 205 which in turn connects to a valve plunger assembly 206 of a fluid valve 207. The assembly 206 includes regulating enlargements 208, 208′ and 208″, which cause the hydraulic fluid to flow in either of the conduits 210 or 211. The conduit 209 carries the hydraulic fluid to the valve 207, while the conduit 209′ serves as a fluid return. This hydraulic system operates at high pressure, 4500 pounds per square inch for example, since the operation of the nose wheel requires such pressures.

The pressure conduits 210 and 211 lead to the steering cylinders 212 and 213, which carry the piston rods 214 and 215 respectively. The rods 214 and 215 are connected to the wheel quadrant 216 for actuation thereof and for simultaneous turning movement of the nose wheel 217 about the center of the quadrant 216.

The piston rod 204 is connected to the follow-up inductive coupler W by means of the telescopic rods 218 and 219. Thus any movement of the piston rod 204 will result in corresponding rotative movement of the rotor 74′ of coupler W. Movements of the rotor 74′ away from the neutral position as shown will cause a signal to be originated in the rotor and the arrangement is such that the signal therefrom will buck the original turn-producing signal from coupler N. The phase relation of these signals should be opposite so that the signal produced by coupler W will tend to cancel out the signal from coupler N and thus give a smooth turning effect on the nose wheel 217.

Assuming now that the aircraft rudder makes a correcting movement away from the neutral position, the result will be a small rotative movement of the rotor 74 of coupler N. Assuming also that the relay RE-18 is in the upward position the signal from the rotor 74 will pass through the rotor 74′ of coupler W and thence to the electronic control unit S. This will produce a greater signal in one output terminal of unit S, and assuming that this will be terminal 2″, the slide valve assembly 56″ will move to the left in Fig. 5a. This displacement causes hydraulic fluid to be admitted to the valve inlet 65″ and thence through the conduit 200 extending to the servo cylinder 202. The fluid pressure in the cylinder causes the piston 203 to be moved to the right, carrying with it the piston rod 204. Movement of the rod 204 to the right moves the valve plunger 206 to the right, and the portion 208 thereof now will uncover the fluid inlet conduit 209 and permit fluid to pass through the valve 207 to the pressure conduit 210. The fluid then passes to the steering cylinder 212 to effect outward movement of the piston rod 214, which will result in a limited counterclockwise rotation of the nose wheel about the vertical axis.

The movement of the piston rod 204 to the right as described above will simultaneously rotate the rotor 74′ of the coupler W in a counterclockwise direction and a signal will accordingly appear in the rotor windings proportional to its displacement away from the neutral or no-signal position. This signal will have a phase relation opposed to that of the original turn-producing signal from the rotor 74 of coupler N. These two signals will thus tend to cancel each other and the nose wheel will return to its neutral or straight ahead position. The result is a smoother operating turn control apparatus, devoid of any tendency to over control the nose wheel. The coupler W may thus be said to form a follow-up control means for the turn control apparatus.

It is preferred to employ two separate hydraulic systems, one at low pressure and one at high pressure as explained above. The balanced solenoid valve M″ and the servo cylinder 202 connected thereto work at the lower pressure (150 pounds), while the valve 207 and the steering cylinders 212 and 213 work at the higher pressure (4500 pounds). One reason for this arrangement is that the solenoid valve M″ is rather delicate in its action and would not function as well at the high pressure required for the steering cylinders. Thus the double system has been found more practical in spite of its greater complexity.

*Marker beacon receiver coupling*

The marker beacon receiver of standard construction comprises a crystal controlled radio receiver tuned to pick up signals having a frequency of 75 megacycles. The construction of marker beacon stations and marker beacon receivers is described in "Principles of Aeronautical Radio Engineering" by P. C. Sandretto (1942), pages 146 to 167, published by McGraw-Hill Book Company, and further details need not be stated here except to again point out that Fig. 8 illustrates the marker beacon receiver antenna at MBRA.

As shown in Fig. 3a (upper right-hand corner) the signal output from the marker beacon receiver is fed through the holding coil of a relay RE-16, forming part of the marker beacon receiver coupling MBRC. Before a signal reaches the marker beacon receiver the static condition of the tube 28D8 is non-conducting, for the reason that the potential on the control grid $k$ is zero. However when a signal causes the relay RE-16 to be energized the relay contactor assumes an upward position, to apply 28 volts to the control grid of the tube. The 20 microfarad condenser $m$ now charges up immediately, since the time constant of the charging circuit is 0.02 of a second. The tube then is capable of conducting a current from the cathode n to the plate o, and as a result the charge accumulated by the 10 microfarad condenser p passes through the tube to energize the holding coil of relay RE-17. The relay contactor is thus moved upward to complete a circuit to the selector stepping circuit SC, provided that the selector gang 1e is at points 4, 5 or 6. Closing this circuit then steps the selector from point 4 to point 5, from point 5 to point 6, or from point 6 to point 7.

Since it is desired to step the sequence selector only once upon passing into and through the marker beacon signal field, accordingly the marker beacon receiver coupling provides an output which is a short duration pulse of voltage sufficient to actuate the relay RE-17. This pulse comes immediately upon entering the signal field, in the manner described above, and the receiver coupling output then drops to a very low potential value incapable of actuating relay RE-17. To understand the reason for this circuit action it should be appreciated that the tube 28D3 continues to conduct as long as a signal is received and therefore condenser p will not accumulate a charge sufficient to operate the relay RE-17, even if the beacon signal is of the intermittent type as in the case of outer and inner marker beacons.

The conductive condition of the tube 28D8 will be determined by the signal received by the marker beacon receiver. For instance if a continuous 75 megacycle signal is received the control grid voltage will remain elevated because the relay RE-16 will stay in the upward position. If the signal is of an intermittent character, the tube will continue to conduct between signals, because the time constant of the discharge circuit of the condenser m is about 34 seconds. Thus the charge of condenser m will maintain the control grid potential between signals. Thus, regardless of the type of signal received by the marker beacon receiver the relay RE-17 operates only once on reaching the beacon signal field, and then disconnects remaining disconnected until another beacon signal field is encountered. Of course between the marker beacons the condenser p, which provides a firing discharge to operate the relay RE-17, has ample time to acquire a full charge. The condenser is connected directly to the negative 28 volts on one side and through a 10,000 ohm resistor q on the other side to the positive 28 volts.

From the above description of the marker beacon receiver coupling it is seen that the tube 28D8 is made to fire a short duration pulse to operate the relay RE-17 and after firing, the relay RE-17 drops back to disconnected position even if the beacon signal continues to be received. The relay RE-17 is thus closed just long enough to operate the selector stepping circuit once for each marker beacon encountered by the aircraft.

Radio compass

The radio compass as used in the control system is shown in some detail in Fig. 7 of the drawings. A radio compass loop RCL is provided in fixed position on the aircraft (see Fig. 8), which feeds into the grid circuits of a pair of vacuum tubes 100 and 101, the midpoint of the loop being also connected to the negative terminal of a C-battery or equivalent source through the secondary of transformer 102. The primary of transformer 102 is connected to a 48 cycle switching frequency oscillator. The vacuum tubes 100 and 101 are biased to cutoff by the C-battery, passing current only when successive half cycles of the switching frequency generated by the 48 cycle audio oscillator alternately drive the grids above cutoff. The radio frequency voltage passed from the coil 103, in the common plate circuit of tubes 100 and 101, to the coil 104 connected to the input of a conventional radio receiving set is thus alternately reversed in phase. A voltage from the nondirectional or sense antenna RCSA (see Fig. 8) is coupled to the coil 105 in proper phase relation so that the loop antenna voltage either adds to or subtracts from it. The combined radio frequency voltage is applied to the compass receiver where it is detected and amplified.

When the aircraft is flying directly toward the station the output of the compass receiver has the same amplitude for both the in phase and out of phase conditions of the loop and the nondirectional antennas. If the aircraft is not flying directly toward the station the receiver output amplitude during the period when the two antennas are in phase differs from the output amplitude during the period when the two antennas are out of phase. This difference is brought about by the fact that the cardioid pattern of the antenna system is rotated 180° each time the phase relation between the two antennas is reversed by the 48 cycle switching voltage.

In order to produce a direct voltage having an amplitude that is a function of the departure of the aircraft heading from the course to the radio compass station and having a polarity indicating whether the error is to right or left of the true course, the difference in the rectified outputs of the receiver for the in phase and out of phase conditions of the two antennas is obtained. This is accomplished by means of a rectifying circuit comprising rectifiers 106 and 107 and transformers 108 and 109, connected to load resistor 110 as shown. The receiver output and the switching voltage are applied to this circuit after amplification in tube 111.

Since the 48 cycle switching voltage applied to the rectifying circuit is obtained from the same source as that applied to the antenna switching circuit, one of the rectifiers for example 106 is rendered conductive and the other nonconductive when the two antennas are operating in phase, and the other rectifier 107 is rendered conductive with the rectifier 106 nonconductive for the out of phase condition of the antennas. The receiver output from transformer 112 therefore sends a direct current downward through the lower half of resistor 110 for the in phase condition and upward through the upper half of resistor 110 for the out of phase condition. If the aircraft is headed toward the station the currents in the two halves of resistor 110 are equal and opposite resulting in zero voltage across the terminals C-1 and C-2. If the aircraft is not flying directly toward the station the current in the lower half or the upper half of resistor 110 will predominate, causing the terminal C-1 to be positive or negative, depending on whether the aircraft is to the right or left of the true course. This direct current voltage of changing polarity is passed on to the automatic approach coupling for conversion to a phase shifting alternating current capable of operating the automatic pilot.

It will be noted that the radio compass circuit includes two variable condensers 113 and 114, which are preferably arranged as a gang condenser operated by the same shaft. This common operating means for the two condensers provides the radio compass tuning control for adjusting the compass circuit so as to receive only a single nondirectional beacon signal for each setting of the condensers. The frequency tuner unit for the radio compass is connected directly to the compass condensers and provides for selection of several wavelengths or channels. For each channel of the tuner device the tuning condensers are moved only a limited predetermined amount. The tuner may be in the form of a bank of solenoids, each having a different length of stroke and acting on a ratchet wheel carried on the tuner shaft. Each solenoid will thus turn the shaft through a certain angle and each will provide a separate channel corresponding to the wavelength of the radio compass station under consideration. The separate tuner channels are indicated in Fig. 3a by the numerals TC-1, TC-2 and TC-3. Since the preferred aircraft control system requires the aircraft to home on only two nondirectional stations, the third control channel TC-3 is for use in case the flight plan is to be changed to employ an additional station seeking step in the plan. In fact any number of such steps may be used in the flight plan for extending the cruise phase of the flight. The use of these consecutive homing steps may be used with or without the step which is ended when the air log device runs out. In other words the radio compass directional control of the aircraft may be employed from the very beginning of the cruise portion of the flight.

A particular form of radio compass tuner which provides a series of tuning channels is disclosed in the patent to Crane et al., (2,322,255), previously mentioned, wherein the tuner is identified as a "frequency tuner 26." This tuner is more fully disclosed and claimed in the patent to Crane and Barbulesco No. 2,253,508 (see Fig. 5). This patented tuner is very well adapted for use in the present control system to obtain a precise radio compass tuning for homing on two or more radio compass stations, or as identified in Figs. 2 and 2a nondirectional radio beacons No. 1 and No. 2.

*Automatic pilot*

The automatic pilot which forms part of the present aircraft control system is a well-known type of electrical pilot and because of its construction lends itself very well to the purposes of automatic flight control. This pilot has reached a state of development where it is not only reliable and efficient but also includes adjuncts particularly adapted for translating various electrical signals into appropriate aircraft control movements. The purpose of describing the auto-pilot in some detail is to bring out the modifications of the pilot signal system which are necessary in adapting the auto-pilot for use in the present aircraft control system.

Considering first the block diagram of Fig. 9 for an explanation of the basic circuit of the auto-pilot, the lines connecting the separate units represent signal conductors carrying signals having directions of flow as indicated by the arrowheads. The auto-pilot includes a gyrosyn compass, or gyrosyn, for governing operation of the aircraft direction or yaw controls (rudder). It also includes a vertical gyroscope for governing operation of the aircraft pitch controls (elevator) and also the aircraft roll controls (aileron). The flux valve is a direction sensing device acted on by the earth's magnetic field and adapted to produce a signal for operation of a selsyn unit to maintain the axis of the gyrosyn rotor along a north-south line. The purpose of the grosyn amplifier will be explained below.

In the use of the auto-pilot in the normal and well-known manner, the pedestal controller situated in the pilot's cockpit carries all the necessary manual controls. The pedestal controller includes turn, pitch and aileron controls by means of which signals may be applied manually for actuating appropriate servomotors capable of moving the aircraft control surfaces. The controller also carries switch SW-6 and SW-7. The switch SW-6 merely applies power to the auto-pilot amplifiers and to the motor of the motor-generator set. The constant altitude control switch SW-7 acts to engage a solenoid-operated clutch so as to mechanically connect an aneroid element to an electrical signal generator similar in principle to the couplers described in the "Brake control" section hereinabove. By this device a signal is fed to the pitch signal channel of the auto-pilot for maintaining the same altitude in effect as obtains when the switch SW-7 is turned on. The switch SW-7 connects also to a magnetic clutch on the pilot's pitch control unit, so as to disengage the pitch control knob from the pitch control unit when the constant altitude control switch SW-7 is turned on. In operation of the present aircraft control system the constant altitude control is placed in operation simply by closing the same solenoid circuit which would normally be closed by movement of switch SW-7 to the "on" position and further reference to this arrangement will be found below.

Considering first the turn control channel of the auto-pilot it will be noted that a signal lead from the gyrosyn compass extends to the rudder selsyn. This lead is actually a three-phase connection from the field winding of the yaw selsyn, forming part of the gyrosyn, to the field windings of the rudder selsyn. By this means deviations of the aircraft from the heading which it has when the auto-pilot is engaged are detected by the flux-valve selsyn system and any deviation results in a signal from the rotor of the rudder selsyn to the rudder amplifier. The output of the amplifier is applied to the rudder generator of the 400 cycle motor generator set. This output excites the rudder generator field windings so as to produce a generator output from the armature windings capable of driving the rudder servomotor to produce rudder action for correction of the original course deviation. Included in the rudder servo unit there is also a position repeatback selsyn, which puts a signal back into the rudder amplifier to cancel out the original signal. This repeatback signal is thus adapted to prevent over travel of the rudder servomotor as the latter corrects the rudder setting.

In order to bring about a new heading of the aircraft a signal lead is provided extending from the turn control unit of the pedestal controller to the turn control amplifier. The latter has its output signal applied to the motor anticipator mechanically coupled by reduction gearing to the rudder selsyn. The motor anticipator is a motor-generator set, and in applying the amplified signal to the motor element, the generator is driven to provide a counter-turn signal which is fed back to the turn control amplifier. This counter signal in effect cancels the original turn signal and produces only a limited and precise rudder selsyn movement through the reduction gearing between the motor anticipator and the rudder selsyn. Movement of the rudder selsyn by means of the motor anticipator sets up a turn signal through the rudder amplifier, rudder generator and rudder servo. However, as a turn is executed the yaw selsyn of the gyrosyn compass also feeds a signal to the rudder selsyn and the effect is to produce a smooth turn, since the yaw selsyn signal constantly bucks the turn signal induced by rotation of the rudder selsyn. The new position of the yaw selsyn and the rudder selsyn will be reached at the same time that the new heading is in effect. A part of the turn signal is fed to the bank integrator to produce an aileron or roll signal through the aileron amplifier, aileron generator and aileron servo unit. This results in a smoothly banked turn for any normally executed procedural turn.

The roll action of the aircraft is stabilized by means of a roll selsyn included in the vertical gyro, the selsyn having a rotor and stator which are relatively movable. Any tendency of the aircraft to roll is thus adapted to originate a signal in the stator of the selsyn which is sent to the aileron amplifier, aileron generator and aileron servo unit. The latter includes a repeatback selsyn which gives a bucking signal to cancel out the aileron signal being fed to the aileron amplifier. By the same signal channel a desired roll movement may be caused through operation of the aileron control unit of the pedestal controller.

The aircraft is stabilized in pitch by means of a pitch selsyn forming part of the vertical gyro and having relatively movable rotor and stator elements. Any pitching movements of the aircraft will cause a signal to be produced in the selsyn stator which is fed into the elevator amplifier. The amplifier signal output acts to excite the elevator generator field and thus produce an elevator servo voltage to operate the elevators in a direction such as to correct the pitch tendency which caused the signal. For any new positon of the elevators, the elevator trim tabs are also adapted to have a new position by use of a trim tab servo which receives part of the current from the elevator generator. In this instance Fig. 9 also shows the repeatback or elevator selsyn which as in all the servo units is mechanically coupled to the servo motor by reduction gearing. Thus the servomotor may rotate several hundred revolutions for only one revolution of the repeatback selsyn. The repeatback selsyn feeds a signal back into the elevator amplifier to give a signal-neutralizing or follow-up effect to prevent over control or "hunting" of the elevator surfaces. The pitch control unit of the pedestal controller is adapted to originate a pitch signal when an aircraft up or down movement is to be produced manually. This signal is fed to the elevator amplifier just as above outlined with respect to signals coming from the pitch selsyn.

Reference is now made to Fig. 10 for illustration of modifications required in the auto-pilot signal system, so as to adapt the pilot for use in the present aircraft control system. The two gyro units are shown diagrammatically and the upper or gyrosyn compass unit 120 will be described first. As shown the unit 120 comprises a frame 121 mounted for rotation about the $y$—$y$ axis. A gyroscope 122 is mounted within the frame for limited rotation about the $x$—$x$ axis with respect to the frame. The gyroscope is in fact a small three-phase induction motor having a high rotor speed, say 20,000 R. P. M. for example. The axis of gyroscopic rotation is the $z$—$z$ axis shown, and by means of the flux valve selsyn 123 this axis is held in a north-south direction at all times. In addition this axis direction is held as closely as possible by the use of a slaving torque motor 124 mounted for rotation on the $x$—$x$ axis, the motor being electrically connected to the rotor of the yaw selsyn 126 through the gyrosyn amplifier. By employing the slaving motor the precessing tendencies of the gyroscope are counteracted. Some precession would be unavoidable otherwise, since the gyroscope bearings have some friction and the gyroscope cannot be in perfect balance either. The flux valve 125 is also shown diagrammatically and as indicated has its field windings connected to the field windings of the flux valve selsyn 123. The rotor of the yaw selsyn 126 is adapted to be rotated by relative movement of the frame 121 and the selsyn stator. The resulting signal induced in the selsyn stator windings is passed to the rudder selsyn 127, and through the gyrosyn repeater amplifier is also passed to the gyrosyn repeater 128. The latter is merely a direction indicating device embodying a selsyn unit and adapted to show the aircraft course heading at any time.

While the gyroscope 122 is mounted so as to turn within limits about the $x$—$x$ axis, it is desired to maintain it level about this axis during level flight and the gyrosyn unit is thus provided with a leveling means. This erection or leveling means comprises a liquid level control switch mounted on the gyrosyn compass and adapted to actuate a leveling torque motor which spins about a vertical axis. As long as the gyroscope 122 is level with respect to the $x$—$x$ axis the liquid level switch is off, but if the gyroscope becomes tilted slightly the motor will start up in a direction to correct the tilting of the gyroscope. When a turn is being executed by the use of the pilot's turn control this gyroscope erection means is automatically cut out to allow a correctly banked turn to be made without effecting operation of the erection motor. All of the foregoing descriptive matter sets out the main features of the auto-pilot and also furnishes a basis for describing one modification of the auto-pilot signal system. The output signal of the gyrosyn repeater amplifier is connected to a synchro-control transformer SCT besides being used to operate the gyrosyn repeater. The transformer SCT is merely a selsyn unit having a rotor which may be adjusted through a 360° angle by a manual control knob, and in the present case the setting dial of the transformer is calibrated to show heading direction. Normally the heading on the transformer dial will correspond with the aircraft heading as shown on the gyrosyn repeater 128. However to select a different aircraft heading, as for instance for the cruise phase of the automatic flight, the transformer SCT is adjusted to the desired heading. The rotor element now develops a voltage according to its out of phase relation with respect to the yaw selsyn. The signal produced is connected through the relay RE-15 (see Fig. 3a) to the last stage of amplification of the yaw channel incorporated in the automatic approach coupling. After the turn is completed to give the new heading the setting of transformer SCT and the reading of the gyrosyn repeater become the same and no further signal is produced by the transformer unless a further adjustment is made. The yaw channel also carries the signals produced by the radio compass and the localizer receiver, which signals are connected to the coupling only upon operation of the relays RCR and LRR in the manner described in the previous section entitled "Control system circuit." The output of the yaw channel of the approach coupling indicated at 129 is fed to a transformer 130 and the transformer output is passed to the signal leads marked "To turn control amplifier." One of the transformer leads goes by way of the manual switch SW-5 which is adapted to be set at contact AF for "automatic flight" or at AP for use of the auto-pilot in the normal and well-known manner. With the switch on contact AP the signals are sent to the turn control amplifier are from the pilot's turn control 131, which comprises a small power transformer and an adjustable voltage divider. The voltage divider control knob is located on the pedestal controller (Fig. 9) and designated by the word "Turn." When the aircraft has completed a desired turn by the use of the pilot's turn control 131, the knob is set back to neutral or no-signal position.

Considering the vertical gyro 132 and the signal system energized thereby, it will be seen that the gyro 132 comprises a frame 133 mounted for limited rotation about the $x$—$x$ axis and a gyroscope 134 mounted within the frame for limited rotation about the $z$—$z$ axis. The gyroscope has a constant high rotative speed about the $y$—$y$ axis, the unit being simply a small squirrel-cage motor similar in every respect to the gyroscope 122 of the gyrosyn compass. Mounted on the $x$—$x$ axis of the gyro unit is a roll selsyn 135. Since the gyro unit tries to maintain itself with the $y$—$y$ axis vertical any deviation in roll causes the stator of the selsyn 135 to rotate with respect to the rotor thereof. The result is a roll signal voltage having a magnitude proportional to the selsyn displacement and having a phase relation which is detected by the aileron amplifier (Fig. 9), the latter being supplied with power of unchanging phase. Thus the phase of the roll signal voltage represents the direction of displacement and the magnitude represents the amount of displacement. The signal from the roll selsyn is applied to the rate section of the aileron amplifier by way of the leads RS-1. The signal passes to the mixer section of the amplifier which acts to combine any signal derived from the displacement section with signals derived from the rate section. The sum of these signals is amplified and then goes to the aileron generator for effecting aileron movement as previously described. At the same time a rate signal is fed to the aileron amplifier through leads RS-1, a displacement signal may also be fed by way of the leads DS-1, as for instance from the bank integrator or from the pilot's roll control 136. The latter unit comprises a transformer supplied from an alternating current source and an adjustable voltage divider having a control knob located on the pedestal controller and designated "Aileron" (Fig. 9).

The other reference axis $z$—$z$ of the vertical gyro unit 132 has mounted thereon a pitch selsyn 137, the arrangement being such that movements of the gyro frame 133 about the $z$—$z$ axis causes the stator of the selsyn to be rotated with respect to the rotor thereof. Thus with the $x$—$x$ axis extending in a fore-and-aft direction with respect to the aircraft any deviation in aircraft pitch will produce a pitch signal from the selsyn 137 which signal goes by way of the leads RS-2 to the rate section of the elevator amplifier. The signal having reached the amplifier it then passes through the rate section to the mixer section of the amplifier where it is combined with any displacement signals fed by way of the signal leads DS-2. The combined rate and displacement signal from the amplifier is used to excite the elevator generator which in turn produces current capable of operating the elevator and trim tab servos. Displacement signals fed to the elevator amplifier by leads DS-2 may be derived from the pilot's pitch control unit 138, this unit comprising a transformer connected to an alternating current source and feeding an adjustable voltage divider which may be set by a control knob on the pedestal controller designated by the word "Pitch" in Fig. 9. When the unit 138 is in use the switch SW-2, previously referred to in connection with Fig. 3, is set at contact AP and the switch SW-4 is also set at contact AP. The signal from the unit 138 after passing through the switch SW-4 is conducted on one of the leads DS-2 by way of the secondary winding of the constant altitude control transformer 140. The input to the primary of this transformer is cut off if the altitude control clutch previously mentioned is disengaged. In operation of the present aircraft control system the constant altitude control switch SW-7 is always turned on so that the clutch between the pitch control unit 138 and the pitch knob of the pedestal controller will be disengaged. The circuit to the constant altitude control clutch as usually completed, through switch SW-7 is rerouted so as to be completed only by action of the relay RE-1, as shown in Fig. 3.

In passing it might be noted that the vertical gyro 132 is provided with a two-way leveling or erection system, which includes a liquid level switch having two sets of contacts for actuation of two separate torque motors one for each of the gyro axes $x$—$x$ and $z$—$z$. The torque motors are mounted on the two axes, but due to the principle of gyroscopic precession the roll erection torque motor is mounted on the pitch axis $z$—$z$, while the pitch erection torque motor is mounted on the roll axis $x$—$x$. These motors which are of two-phase induction type only operate when the gyro tilts slightly about either of the two axes $x$—$x$ or $z$—$z$.

In order to modify the pitch control signal system of the auto-pilot for adapting the same to use in the present aircraft control system a resistance bridge circuit RBC is used to obtain appropriate up and down signals for take-off, climb and initial approach operations. The bridge circuit is fed from the altitude signal transformer AST as shown in Fig. 10 and also in previously mentioned Fig. 3. One terminal of the transformer primary is fed through the terminal 3 of terminal block TB-2, which is merely connected to one phase of a three-phase transformer supplying power of constant frequency to various parts of the auto-pilot. As indicated in Fig. 10 the bridge circuit RBC is adapted to supply either an up or down signal depending on the setting of switch SW-3. However as explained in the section entitled "Control system circuit" these up or down connections are completed in the system with the switch SW-3 off both contacts. In Fig. 10 these connections are made only by the switch SW-3 in order to simplify the description thereof, and it may be seen that an up signal is shown in this view feeding the signal leads RS-2 and DS-2 by way of the manual switch SW-2 and by way of switches SW-3 and SW-4, with the latter switches being in series with the secondary windings of transformers 139 and 140. It is also noted that the two leads of the resistance bridge circuit RBC make connection to terminals 1 and 2 of the terminal block TB-2, and as clearly stated in the description of the control system circuit these terminals are shorted out except on take-off, climb and initial approach. A signal is originated in the transformer 139 only at such times as the glide path receiver is connected to the automatic approach coupling through action of the glide path receiver relay GPRR. The purpose of this signal in the final approach and landing sequences has previously been described, but it is noted that the signal from the receiver passes through the approach coupling by way of a separate glide path channel producing a signal output on the leads 129' which are connected to the primary of the glide path signal transformer 139.

The switch SW-4 referred to above is operated automatically by means of a circuit completed through a separate contactor of the relay GPRR, as illustrated in Fig. 3. This separate contactor is adapted to close the forward and reverse circuits of a small electric motor, which may be termed an automatic approach motor AAM. This motor in turn operates the switch SW-4 in either direction. When the relay GPRR is energized the motor is operated in such a direction as to close the switch SW-4 on contact AA and with the relay deenergized the switch is closed on contact AP. The manual switches SW-2 and SW-5 may remain on contacts AF at all times that the control system is in use, but the switch SW-4 is moved to the automatic approach (AA) position only at the beginning of the final approach to bring the glide path signal into use.

Before beginning the flight the aircraft is lined up with the take-off runway, and on take-off the auto-pilot will hold this original heading as long as no turn signal is fed to the pilot turn signal system. However upon reaching the cruise altitudes the synchro-control transformer SCT is connected to the automatic approach coupling by relay RE-15 and if the pre-set heading on the transformer is different than the instant heading then a signal will be set up to bring in the new heading. This cruise heading in any event should be such as to direct the aircraft toward the first radio compass station, with proper correction being made for drift of the aircraft. If desired this heading may be readjusted manually during the cruise to correct for unexpected cross winds or miscalculations. Of course the direction signals as later received by the radio compass and the localizer receiver, in accordance with the established flight plan, will be connected at the proper times by the appropriate relays RCR and LRR.

The automatic approach coupling unit which has been briefly described above forms a necessary adjunct to the auto-pilot when the same is used for automatic landing of aircraft or for automatic homing by radio compass. In the present system the approach coupling is used with the magnetic heading control, comprising the synchro-control transformer SCT, merely to give a signal boost and not for any alteration or conversion of the signal characteristics. It is clear that the same result could be realized by the use of a separate amplifier, the output of which can be fed to the turn control leads 129 which connect with the transformer 130.

The automatic approach coupling is a two-channel electronic amplifier containing the necessary rate and sensitivity control circuits to convert the signal outputs of the instrument approach receivers to alternating currents which can be fed to the turn and pitch control signal channels of the auto-pilot for making an automatic pilot approach and landing under the influence of the receiver signals. The localizer receiver and radio compass outputs are fed through the approach coupling on the localizer channel comprising a ring-modulator unit including four rectifiers connected in a series bridge and excited with a 400 cycle alternating current potential. This modulator converts the low voltage direct current from the receiver to an alternating current which is phase reversing depending on the direct current polarity at any instant. The ring modulator is followed by four stages of amplification the last of which forms a discriminator stage coupled to one leg of a two-phase motor. This motor operates as part of a motor-generator-selsyn unit, the generator of which supplies the turn control signal through an output amplifier to the automatic pilot. The selsyn unit acts as a position feedback to the discriminator stage input to cancel the original turn signal as received from the ring modulator. The generator output of the motor-generator-selsyn unit is coupled through a single stage amplifier to the turn control channel of the auto-pilot and a portion of the signal is tapped from a voltage divider, to excite a balanced amplifier whose output actuates a relay for removal of gyro erection during application of a turn signal to the auto-pilot.

The automatic approach coupling also includes a glide path channel comprising a ring modulator similar to that described above. The ring modulator is fed by the low voltage direct current from the glide path receiver in such a way as to convert a portion of the 400 cycle alternating current fed thereto into a phase reversing signal, which is coupled by a two-stage amplifier to the pitch control signal channel of the auto-pilot. This results in action of the aircraft elevators in accordance with the position of the aircraft with relation to the glide path.

*Summary*

The foregoing description of the aircraft control system and the component devices thereof provides a rather detailed disclosure. These details are furnished to show the preferred embodiment of the invention but the system is not necessarily limited to the exact combination of devices and details as hereinabove set out. While it is generally preferred to close the various control circuits by the use of relays energized by the action of the sequence selector, it should be understood that many of the vital operating circuits could be closed directly through the selector or through the pressure sensitive aneroid switches. While the description refers to only two aneroid switches or pressurestats PS-1 and PS-2, it may be desired to employ a series of such switches in place of the switch PS-2. These switches may have pressure sensitivities which vary over 1000 foot intervals and by the use of a manual selector switch they may be selected one at a time for accomplishing the function of the aneroid switch PS-2. By this arrangement the cruise altitude of the flight may be pre-selected, In place of detecting the altitude by the aneroid type of instrument it is also feasible to use an absolute altimeter which shows the aircraft altitude above ground. The absolute altimeter as an indicating instrument is amply described in "Principles of Aeronautical Radio Engineering" by P. C. Sandretto, pages 198 to 224. To use the altimeter, regardless of its type, for closing or opening a circuit at a selected altitude the teaching of the prior art may be followed, as for instance in the patents to Crane et al. No. 2,265,149, No. 2,315,501 or No. 2,323,311. Furthermore the latter two patents disclose control means to maintain an aircraft at selected altitudes. The control means disclosed is adapted for use in the present system to maintain constant altitude, by operation of a rotatable inductive coupler capable of feeding signals to the constant altitude transformer 140 to correct any up or down deviation of the aircraft. It should be understood that in the system described herein the constant altitude control is always cut in to the auto-pilot signal system at the same time an up or down signal is cut out. Thus the altitude control is merely required to hold the aircraft at the altitude which is then in effect, by feeding a pitch signal of such magnitude and phase relation as to correct for any altitude variations due to winds or other causes. In the patent to Crane et al. 2,315,501 (Fig. 1), the shaft 40 may be connected to a rotatable inductive coupler which is supplied with alternating current on one of its windings, with the other winding (rotor or stator) connected to the constant altitude transformer 140 of the present control system. With the coupler in a no-signal or neutral position the aircraft would maintain its altitude, but any variation in altitude would cause coupler rotation in one direction or the other to put a correcting signal into the pitch control signal channel of the auto-pilot. In the same way the patent to Crane et al. 2,323,311 includes a control shaft 11 (Fig. 1) which may be used to operate an inductive coupler as explained above.

In describing the control system the voltages and frequencies of various electrical sources are stated as far as possible for the sake of completeness. However it should be appreciated that these values are chosen according to the sources available on the aircraft or according to the requirements of various units and components.

As explained previously the flight plan may be modified to some extent, as for instance by homing on a third radio compass station by the use of the third compass tuning circuit or channel TC-3 (Fig. 3a). Also if desired the approach may be simplified by bringing in the glide path signal and the localizer receiver together on reaching the second radio compass station and coincident marker beacon. By this arrangement the constant altitude phase of final approach (step 6) would be eliminated (see Fig. 2a).

The brake control system described at some length has definite usefulness aside from its application in the complete aircraft control system or in an automatic landing system. For instance in a pilot controlled landing it would be feasible to obtain the same braking action as described merely by closing a manual or automatic switch across the brake control terminals BR—1 and BR—2. By operation of the rudder bar or rudder pedals in the normal manner the aircraft would be guided down the landing strip because of the differential braking action described. All other parts of the brake control system would operate in exactly the same way as has been described in the section headed "Brake control."

The embodiments of the invention herein shown and described are to be regarded as illustrative only and it is to be understood that the invention is susceptible to variations, modifications and changes within the scope of the appended claims.

We claim:

1. In an automatic landing control system for aircraft, an automatic pilot for controlling movements of said aircraft about three principal axes, and having an electrical signal channel corresponding to each of said axes, means automatically connected to the pilot when the aircraft passes over a marker beacon to apply glide path signals to the pitch signal channel and to apply runway-localizer signals to the yaw signal channel, means actuated by contact of the aircraft undercarriage with the ground to apply the right and left wheel brakes differentially, and means actuated by movements of the aircraft rudder in response to said runway-localizer signals for determining the action of the differential brake control of said aircraft and thus effect aircraft steering along the landing runway.

2. In an automatic landing control system for aircraft as recited in claim 1, an additional means actuated by deceleration of the aircraft to regulate the magnitude of the braking force on said right and left wheels for producing a uniform rate of aircraft deceleration from landing speed to a full stop.

3. In an aircraft automatic leading control system, apparatus for applying the wheel brakes comprising, individual servo units connected to the right and left wheel brakes to apply the two brakes independently, means connected to the separate servo units to effect the control of the servo units separately, means actuated by contact of the wheels with the ground to energize the servo unit control means, and a device actuated by deceleration of the aircraft to regulate the action of the servo unit control means for producing a uniform rate of aircraft deceleration from landing speed to a full stop.

4. In an aircraft including an undercarriage provided with right and left hand wheels, each of said wheels having a brake thereon, a brake control apparatus comprising, a separate fluid controlled brake actuator connected to each of said brakes, a fluid regulating valve connected to each of said actuators, solenoid control means included in each of said valves and responsive to electrical braking signals to actuate said valves in both brake applying and brake releasing directions, signal producing means responsive to deviations of the aircraft rudder from neutral position in one direction to actuate one of said valves in a brake applying direction and the other of said valves in a brake releasing direction, and signal producing means responsive to sudden deceleration of the aircraft to actuate both of said valves in a brake releasing direction for producing a uniform rate of aircraft deceleration from landing speed to a full stop.

5. In an aircraft including an undercarriage provided with right and left hand wheels, each of said wheels having a brake thereon, a brake control apparatus comprising, a separate fluid controlled brake actuator connected to each of said brakes, a fluid regulating valve connected to each of said actuators, control means for each of said valves responsive to electrical braking signals to actuate said valves in both brake applying and brake releasing directions, signal producing means adapted to be energized when the aircraft is on the ground for actuating both of said valves in a brake applying direction, and signal producing means mechanically coupled to a movable weight which is responsive to sudden deceleration of the aircraft for actuating both of said valves in a brake releasing direction, for producing a uniform rate of aircraft deceleration from landing speed to a full stop.

6. In an aircraft including an undercarriage provided with right and left hand wheels, each of said wheels having a brake thereon, a brake control apparatus comprising, a brake servo unit connected to each brake to apply the separate brakes independently and thus effect aircraft steering along the ground, means connected to each brake servo unit to effect independnt control thereof, means actuated by contact of the undercarriage with the ground to energize the servo unit control means, means responsive to aircraft rudder deviations from neutral position for differentially controlling the servo unit control means, and means actuated by deceleration of the aircraft to regulate the action of the servo unit control means for producing a uniform rate of aircraft deceleration from landing speed to a full stop.

7. In an aircraft control system, a relay operable by an electrical impulse, a marker beacon receiver on the aircraft, an electrical coupling means connected to the marker beacon receiver and adapted to supply said relay operating electrical impulse when said aircraft reaches a marker beacon signal field, said coupling comprising a relay and a vacuum tube, said latter relay being actuated by a signal from said receiver to connect a potential to the vacuum tube grid circuit for causing the tube to conduct a stored electrical charge which furnishes said relay operating electrical impulse.

8. In an aircraft control system as recited in claim 7, said vacuum tube grid circuit including a condenser which is adapted to store a charge for maintaining a potential on the vacuum tube grid when the marker beacon signals are of an intermittent type.

9. In an aircraft control system as recited in claim 7, a condenser for providing the source of said stored electrical charge, a potential source for charging said condenser, and a resistance in series with said potential source and condenser to provide a slow rate of charge for said condenser.

10. In an aircraft control system, the combination witih said aircraft of an engine for propelling said aircraft, a throttle valve on the engine intake manifold for regulating the fuel consumption and power output, an electrical servomotor for moving said throttle valve toward open or closed positions in response to signals applied to said servomotor, a signal producing means connected to said servomotor and having a series of signal channels to provide a multiplicity of selective throttle valve settings, switching means automatically operable during a complete aircraft flight to select throttle valve settings appropriate to the aircraft attitude in the various phases of the flight, pressure responsive means connected to the engine intake manifold for producing a servomotor regulating signal to maintain constant engine power outputs at each of said throttle valve settings, and pressure responsive means connected to an air stream Pitot tube for producing a power limiting signal for application to said servomotor and effective to reduce the engine power output during glide phases of the aircraft flight.

11. In an aircraft control system, the combination with said aircraft of an engine for propelling said aircraft, a throttle valve on the engine intake manifold for regulating the fuel consumption and power output, an electrical servomotor for moving said throttle valve toward open or closed positions in response to signals applied to said servomotor, a signal producing means connected to said servomotor and having a series of signal channels to provide a multiplicity of selective throttle valve settings, switching means automatically operable during a complete aircraft flight to select throttle valve settings appropriate to the aircraft attitude in the various phases of the flight, and pressure responsive means connected to the engine intake manifold for producing a servomotor regulating signal to maintain constant engine power outputs at each of said throttle valve settings.

12. In an automatic control system for aircraft, an automatic pilot for controlling movements of said aircraft through the coordinated movements of movable airfoil elements, including a rudder, on the aircraft adapted to effect aircraft control about three principal control axes designated as yaw, pitch and roll axes respectively, said automatic pilot having separate electrical signal channels corresponding to each of said control axes, means including a radio compass receiver adapted to receive signals from non-directional radio beacons and apply beacon seeking signals to the yaw signal channel of said pilot to provide for directional guidance of the aircraft to the vicinity of a preselected landing field equipped with a runway-localizer signal station and a glide path signal station, means actuated by signals from an outer marker beacon located adjacent to the last non-directional radio beacon to apply runway-localizer signals to the yaw signal channel of said pilot for guiding the aircraft to said preselected landing field along a path approximately in the same vertical plane as the longitudinal axis of the landing runway, means actuated by signals from an inner marker beacon to continue application of said runway-localizer signals to the yaw signal channel of said pilot and simultaneously apply glide path signals to the pitch signal channel of said pilot, means actuated in response to contact of the aircraft undercarriage, including right and left wheels, with the runway to actuate the right and left wheel brakes differentially, and means actuated by movements of the aircraft rudder in response to said runway-localizer signals for controlling the action of the differential brake actuating means and thus effect aircraft steering along said runway in a path approximately coinciding with the longitudinal axis of said runway.

13. In an automatic control system for aircraft, an automatic pilot for controlling movements of said aircraft through the coordinated movements of movable airfoil elements, including a rudder, on the aircraft adapted to effect aircraft control about three principal control axes, designated as yaw, pitch and roll axes respectively, said automatic pilot having separate electrical signal channels corresponding to each of said control axes, means including a radio compass receiver adapted to receive signals from non-directional radio beacons and apply beacon seeking signals to the yaw signal channel of said pilot to provide for directional guidance of the aircraft to the vicinity of a preselected landing field equipped with a runway-localizer signal station and a glide path signal station, means actuated by signals from an outer marker beacon located adjacent to the last non-directional radio beacon to apply runway-localizer signals to the yaw signal channel of said pilot for guiding the aircraft to said preselected landing field along a path approximately in the same vertical plane as the longitudinal axis of the landing runway, means actuated by signals from an inner marker beacon to continue application of said runway-localizer signals to the yaw signal channel of said pilot and simultaneously apply glide path signals to the pitch signal channel of said pilot, means included in the aircraft undercarriage to effect steering of the aircraft along the runway after landing, and means actuated by movements of the aircraft rudder in response to said runway-localizer signals for controlling the action of said steering means and thus effect aircraft steering along said runway in a path approximately coinciding with the longitudinal axis of said runway.

14. In an automatic control system for aircraft, an automatic pilot for controlling movements of said aircraft through the coordinated movements of movable airfoil elements, including a rudder, on the aircraft adapted to effect aircraft control about three principal control axes designated as yaw, pitch and roll axes, respectively, said automatic pilot having separate electrical signal channels corresponding to each of said control axes, means actuated by signals from a marker beacon located on the approach to a landing field to apply runway-localizer signals to the yaw signal channel of said pilot and to simultaneously apply glide path signals to the pitch signal channel of said pilot for guiding the aircraft to said landing field along a path approximately in the same vertical plane as the longitudinal axis of the landing runway and at a low glide angle with respect to said axis, said runway-localizer and glide path signals emanating from a runway-localizer signal station and a glide path signal station respectively provided on said landing field, means actuated in response to contact of the aircraft undercarriage, including right and left wheels, with the runway to actuate the right and left wheel brakes differentially, and means actuated by movements of the aircraft rudder in response to said runway-localizer signals for controlling the action of the differential brake actuating means and thus effect aircraft steering along said runway in a path approximately coinciding with the longitudinal axis of said runway.

15. In an automatic control system for aircraft, an automatic pilot for controlling movements of said aircraft through the coordinated movements of movable airfoil elements, including a rudder, on the aircraft adapted to effect aircraft control about three principal control axes designated as yaw, pitch and roll axes respectively, said automatic pilot having separate electrical signal channels corresponding to each of said control axes, means actuated by signals from a marker beacon located on the approach to a landing field to apply runway-localizer signals to the yaw signal channel of said pilot and to simultaneously apply glide path signals to the pitch signal channel of said pilot for guiding the aircraft to said landing field along a path approximately in the same vertical plane as the longitudinal axis of the landing runway and at a low glide angle with respect to said axis, said runway-localizer and glide path signals emanating from a runway-localizer signal station and a glide path signal station respectively provided on said landing field, means included in the aircraft undercarriage to effect steering of the aircraft along the runway after landing, and means actuated by movements of the aircraft rudder in response to said runway-localizer signals for controlling the action of said steering means and thus effect aircraft steering along said runway in a path approximately coinciding with the longitudinal axis of said runway.

16. In an automatic control system for aircraft as recited in claim 15, wherein said means to effect steering of the aircraft comprises a steerable nose wheel and wherein said means actuated by movements of the aircraft rudder comprises a servomechanism and a servomechanism control means responsive to electrical signals originating in a rudder controlled signal producing unit.

17. In an automatic landing control system for guiding an aircraft to a landing field equipped with a runway and a runway-localizer signal station, an automatic pilot for controlling movements of movable control elements on the aircraft adapted to effect aircraft control about three principal control axes designated as yaw, pitch and roll axes respectively, said automatic pilot having separate electrical signal channels corresponding to each of said control axes, means to apply runway-localizer signals to the yaw signal channel of said pilot whereby to maintain the aircraft in directional alignment with the longitudinal axis of said runway, a steering control unit adapted for actuation by said yaw signal channel, means included in the aircraft undercarriage to effect steering of the aircraft along said runway after landing, and means actuated by said steering control unit in response to said runway-localizer signals for controlling the action of said steering means and thus effect aircraft steering along said runway in a path approximately coinciding with the longitudinal axis of said runway.

18. In an automatic landing control system for guiding an aircraft to a landing field equipped with a runway and a runway-localizer signal station, an automatic pilot for controlling movements of movable control elements, including a rudder, on the aircraft adapted to effect aircraft control about three principal control axes designated as yaw, pitch and roll axes respectively, said automatic pilot having separate electrical signal channels corresponding to each of said control axes, means to apply runway-localizer signals to the yaw signal channel of said pilot for guiding the aircraft through action of said rudder to said landing field along a path approximately in the same vertical plane as the longitudinal axis of said runway, means included in the aircraft undercarriage to effect steering of the aircraft along said runway after landing, and means actuated by movements of the aircraft rudder in response to said runway-localizer signals for controlling the action of said steering means and thus effect aircraft steering along said runway in a path approximately coinciding with the longitudinal axis of said runway.

19. In an automatic control system for aircraft having movable control surface members for controlling movements of said aircraft about three principal axes, an automatic pilot for exerting control over said movable control surface members and for maintaining said aircraft in level flight, means automatically connected to said automatic pilot when the aircraft reaches a selected cruise altitude to apply a constant altitude signal to said automatic pilot, signal producing means connected to said automatic pilot simultaneously with said constant altitude signal and capable of developing a magnetic heading signal preselected to direct said aircraft in a cruise direction toward a distant radio compass station, and means set in operation at the same time said constant altitude and magnetic heading signals are connected to said automatic pilot for switching from a magnetic heading signal to a radio compass homing signal when the aircraft reaches a point close to but short of said radio compass station.

20. In an automatic control system for aircraft having movable control surface members for controlling movements of said aircraft about three principal axes, an automatic pilot for exerting control over said movable control surface members and for maintaining said aircraft in level flight, means automatically connected to said automatic pilot when the aircraft reaches a selected cruise altitude to apply a constant altitude signal to said automatic pilot, signal producing means connected to said automatic pilot simultaneously with said constant altitude signal and capable of developing a magnetic heading signal preselected to direct said aircraft in a cruise direction toward a distant radio compass station, and means including a switching device operated by an air-driven propeller set in operation at the same time said constant altitude and magnetic heading signals are connected to said automatic pilot for switching from a magnetic heading signal to a radio compass homing signal when a predetermined mileage has been flown to a point close to but short of said radio compass station.

21. In an automatic control system for aircraft having movable control surface members for controlling movements of said aircraft about three principal axes, an automatic pilot for exerting control over said movable control surface members and for maintaining said aircraft in level flight, altitude responsive switching means, means automatically connected to said automatic pilot by said switching means when the aircraft reaches a selected cruise altitude to apply a constant altitude signal to said automatic pilot, and means including electrically connected yaw selsyn and synchro-control selsyn units adapted for connection to said automatic pilot at the same time said constant altitude signal is so connected, for developing a preselected magnetic heading signal according to the manual setting of said synchro-control selsyn unit with respect to the relative setting of said yaw selsyn.

22. In an automatic control system for aircraft having movable control surface members for controlling movements of said aircraft about three principal axes an automatic pilot for exerting control over said movable control surface members and for maintaining said aircraft in level flight, means connected to said automatic pilot when the aircraft reaches a selected cruise altitude to apply a constant altitude signal to said automatic pilot, signal producing means connected to said automatic pilot simultaneously with said constant altitude signal and capable of developing a magntic heading signal preselected to direct said aircraft in a cruise direction toward a distant radio compass station, means set in operation at the same time said constant altitude and magnetic heading signals are connected to said automatic pilot for switching from a magnectic heading signal to a radio compass homing signal when the aircraft reaches a point close to but short of said radio compass station, means connected to said automatic pilot when the aircraft reaches a point over said radio compass station to apply a down signal to said automatic pilot and to apply a radio compass homing signal from a second radio compass station to said automatic pilot, and means connected to said automatic pilot when the aircraft reaches a point over said second radio compass station to apply runway-localizer signals to said automatic pilot for guiding the aircraft to a landing field along a path which lies in the same vertical plane as the longitudinal axis of the landing field runway.

23. In an automatic control system for aircraft having movable control surface members for controlling movements of said aircraft about three principal axes, an automatic pilot for exerting control over said movable control surface members and having yaw, pitch and roll signal channels corresponding to said three principal axes, means connected to said automatic pilot when the aircraft reaches a selected cruise altitude to apply a constant altitude signal to said pitch channel, signal producing means connected to said yaw channel simultaneously with the application of said constant altitude signal and capable of developing a heading signal preselected to direct said aircraft in a cruise direction toward a distant radio compass station, means set in operation at the same time said constant altitude and heading signals are applied to the pitch and yaw channels respectively for switching said yaw channel from a heading signal to a radio compass homing signal when the aircraft reaches a point close to but short of said radio compass station, means connected to said pitch channel when the aircraft reaches a point over said radio compass station to apply a down signal to said pitch channel and to apply a radio compass homing signal from a second radio compass station to said yaw channel, and means connected to said yaw channel when the aircraft reaches a point over said second radio compass station to apply runway-localizer signals to said yaw channel for guiding the aircraft to a landing field along a path which lies in the same vertical plane as the longitudinal axis of the landing field runway.

24. In an aircraft automatic pilot having a vertical gyroscope whose axis of spin is adapted to be held in a vertical direction, means mounting said gyroscope for limited rotation about a transverse axis, a pitch signal system in said automatic pilot including a pitch selsyn mechanically connected to said gyroscope for actuation by gyroscope movements about said transverse axis, a resistance bridge circuit included in said pitch signal system and including two branches alternately connected in said pitch signal system, one of said branches being adapted to originate an aircraft up signal and the other branch being adapted to originate an aircraft down signal, a common source of electrical potential connected to both of said branches, each branch of said bridge circuit comprising a fixed resistor and adjustable resistor in parallel, whereby the adjustment of each adjustable resistor serves to determine the magnitude of the respective aircraft up and down signals.

ROBERT L. FRAZIER.
HARRY B. BREEDLOVE.

(References on following page)

REFERENCES CITED

The following references are of record in the file of this patent:

UNITED STATES PATENTS

| Number | Name | Date |
|---|---|---|
| 1,727,696 | Breguet | Sept. 10, 1929 |
| 2,253,508 | Crane et al. | Aug. 26, 1941 |
| 2,308,846 | White | Jan. 19, 1943 |
| 2,314,029 | Bond et al. | Mar. 16, 1943 |
| 2,321,582 | Crane et al. | June 15, 1943 |
| 2,322,225 | Crane et al. | June 22, 1943 |
| 2,336,891 | Schnell | Dec. 14, 1943 |
| 2,355,026 | Koppen | Aug. 1, 1944 |
| 2,356,922 | Eltgroth | Aug. 29, 1944 |
| 2,357,319 | Esval et al. | Sept. 5, 1944 |
| 2,367,649 | Noorduyn et al. | Jan. 16, 1945 |
| 2,415,430 | Frische et al. | Feb. 11, 1947 |
| 2,423,336 | Moseley | July 1, 1947 |
| 2,444,927 | Gallagher | July 13, 1948 |
| 2,452,311 | Markusen | Oct. 26, 1948 |
| 2,471,821 | Kutzler et al. | May 31, 1949 |
| 2,474,618 | Divoll | June 28, 1949 |
| 2,502,522 | Hoobler | Apr. 4, 1950 |
| 2,539,411 | Esval et al. | Jan. 30, 1951 |